(12) United States Patent
Clark

(10) Patent No.: US 6,716,096 B2
(45) Date of Patent: Apr. 6, 2004

(54) POULTRY FECES REMOVAL APPARATUSES AND METHODS

(75) Inventor: Leonard G. Clark, Dawsonville, GA (US)

(73) Assignee: Hill & Sons, Inc., Ball Ground, GA (US)

( * ) Notice: Subject to any disclaimer, the term of this patent is extended or adjusted under 35 U.S.C. 154(b) by 0 days.

(21) Appl. No.: 09/766,430

(22) Filed: Jan. 18, 2001

(65) Prior Publication Data

US 2001/0034200 A1 Oct. 25, 2001

Related U.S. Application Data

(60) Provisional application No. 60/177,037, filed on Jan. 18, 2000, and provisional application No. 60/253,524, filed on Nov. 28, 2000.

(51) Int. Cl.⁷ ............................................. A22C 21/06
(52) U.S. Cl. .................................................... 452/106
(58) Field of Search ................................ 452/116, 117, 452/119, 120, 122, 165, 176, 106, 109, 75

(56) References Cited

U.S. PATENT DOCUMENTS

| | | | |
|---|---|---|---|
| 2,322,831 A | | 6/1943 | Danielsson |
| 2,817,874 A | | 12/1957 | Conaway |
| 3,002,219 A | * | 10/1961 | Bried ............................ 452/75 |
| 3,137,031 A | | 6/1964 | Ine |
| 3,793,676 A | | 2/1974 | Wiggins |
| 4,153,972 A | * | 5/1979 | Harben et al. ............... 452/116 |
| 4,208,764 A | | 6/1980 | Loth et al. |
| 4,270,242 A | * | 6/1981 | Loth et al. ................... 452/116 |
| 4,283,813 A | | 8/1981 | House |
| 4,739,539 A | | 4/1988 | Simmons |
| 4,876,767 A | | 10/1989 | Harben, III et al. |
| 4,899,421 A | | 2/1990 | Van Der Eerden |
| 4,951,352 A | | 8/1990 | Harben, III et al. |
| 4,979,269 A | * | 12/1990 | Norrie ........................... 452/134 |
| 5,026,317 A | | 6/1991 | Kennedy |
| 5,098,333 A | | 3/1992 | Cobb |
| 5,178,579 A | * | 1/1993 | Simmons ....................... 452/123 |
| 5,299,976 A | | 4/1994 | Meyn |
| 5,334,083 A | | 8/1994 | van den Nieuwelaar et al. |
| 5,336,127 A | * | 8/1994 | Hazenbroek ................. 452/160 |
| 5,569,072 A | * | 10/1996 | Tieleman et al. ............ 452/185 |
| 5,605,503 A | * | 2/1997 | Martin ........................ 452/173 |
| 5,697,836 A | | 12/1997 | Halvorson et al. |
| 5,766,063 A | * | 6/1998 | Hazenbroek et al. ........ 452/117 |
| 5,810,651 A | | 9/1998 | De Heer et al. |
| 5,875,738 A | | 3/1999 | Hazenbroek et al. |

FOREIGN PATENT DOCUMENTS

| | | | |
|---|---|---|---|
| EP | 0512636 A1 | | 11/1992 |
| WO | WO 91/09531 | * | 7/1991 |
| WO | WO 98/47379 | | 10/1998 |

OTHER PUBLICATIONS

International Search Report corresponding to International Patent Application PCT/US01/44768, dated Aug. 5, 2002.

* cited by examiner

Primary Examiner—Peter M. Poon
Assistant Examiner—David J Parsley
(74) Attorney, Agent, or Firm—Alston & Bird LLP

(57) ABSTRACT

An apparatus for removing feces from a bird's intestines while avoiding contact between the feces and the bird's skin. The apparatus includes a clasping device for supporting the bird laterally and for applying squeezing forces to opposite sides of the bird. The clasping device is rotatable between a first position, in which the bird is in a substantially vertical position, and a second position, in which the bird is in a substantially horizontal position. The apparatus further includes a compression assembly that is configured for forcing feces out of the bird by exerting a compressive force on an exterior surface of the bird while the clasping device is squeezing the bird and while the clasping device is in the second position. This compression assembly preferably includes compression members that move in tandem with the bird and the clasping device as the bird moves through an automated processing system.

24 Claims, 18 Drawing Sheets

Fig. 23A

POULTRY FECES REMOVAL APPARATUSES AND METHODS

RELATED APPLICATIONS

This application claims the benefit of provisional patent application No. 60/177,037, which was filed on Jan. 18, 2000, and of provisional patent application No. 60/253,524, which was filed on Nov. 28, 2000, and incorporates both of these applications herein by reference.

FIELD OF THE INVENTION

The present invention relates to poultry processing, and more particularly, to the removal of feces from poultry.

BACKGROUND OF THE INVENTION

During the processing of birds, such as chickens, it is necessary to remove the bird's digestive tract organs from the bird's abdominal cavity. This process is called evisceration. During this process, the bird's digestive tract organs are sometimes inadvertently cut or otherwise opened so that feces is released into the bird's abdominal cavity. As a result, the contaminated birds must either be thoroughly cleaned or discarded. To avoid such contamination, it is desirable to remove the bird's feces before the bird is eviscerated.

Preferably, the bird's feces are removed in such a way that the removed feces has minimal contact with the external surface of the bird. This is because, in the event that the bird's feces does come into contact with the bird's external surface, the bird must be thoroughly cleansed, or, in certain circumstances, discarded from human consumption.

The inventors are aware of several systems designed to remove the feces and/or entrails from poultry, including U.S. Pat. No. 4,739,539 issued to Simmons, U.S. Pat. No. 4,876,767 issued to Harben, III, and U.S. Pat. No. 4,899,421 issued to Van Der Eerden. The Simmons reference is discussed in detail below.

Simmons teaches an apparatus that carries featherless, headless birds upside-down using a conventional conveying system. As the birds are moved along the conveying system, each bird, in turn, is positioned between two rotating, horizontally-disposed wheels. The wheels are positioned so that, when a bird passes between the wheels, a U-shaped surface on the periphery of one of the wheels exerts pressure on the back of the bird, while a V-shaped surface on the periphery of the other wheel exerts pressure on the bird's breast. The resulting combined pressure squeezes feces out of the bird's anus while the bird is suspended by its feet.

One problem associated with the Simmons device is that, after feces is squeezed out of the bird's anus, the feces tends to spill onto the bird's body. Furthermore, because Simmons teaches removing feces from the bird after the bird has been defeathered, any feces that spills onto the bird comes into direct contact with the bird's skin. Thus, a significant percentage of birds that are processed using the Simmons device become soiled during processing. As a result, the soiled birds must be thoroughly cleansed or discarded.

Furthermore, it would appear that, even after the Simmons device squeezes the bird, feces may still remain in the bird. Therefore, birds that have been processed using the Simmons device may still run the risk of fecal contamination while being processed.

Thus, there is an unsatisfied need for an apparatus and method for removing feces from poultry while avoiding contact between the feces and the bird's skin. There is a further need in the art for an apparatus and method for removing the substantial majority of feces from a bird's intestines before the bird is processed further.

SUMMARY OF THE INVENTION

The present invention relates to apparatuses and methods that may be used to remove feces from a bird, such as a chicken, and that are operable to remove feces from the bird while avoiding contact between the feces and the bird's skin. Furthermore, the apparatuses and methods are capable of removing the substantial majority of feces from a bird's intestines before the bird is processed further.

More particularly, the apparatus includes a clasping device configured for receiving a bird and for providing lateral support to the bird, the clasping device being configured for rotation between a first position, in which the bird is in a substantially vertical position, and a second position, in which the bird is in a substantially horizontal position. The apparatus further includes a compression assembly that is configured for exerting a compressive force on an exterior surface of the bird while the clasping device is providing lateral support to the bird and while the clasping device is in the second position. The apparatus preferably includes a back support portion that is adjacent, and preferably between, the two opposing side members.

In a preferred embodiment of the invention, the clasping device is configured for receiving a bird between the two opposing side members and for exerting pressure on opposite sides of the bird. In this embodiment of the invention, the compression assembly is configured for exerting a compressive force on a top surface of the bird's central body portion while the opposing side members are exerting pressure on opposite sides of the bird, and while the clasping device is in the second position. The compressive force is preferably sufficient to force feces out of the body of the bird.

In a first embodiment of the invention, the clasping device is configured for movement relative to the compression assembly. In this embodiment of the invention, the compression assembly preferably includes a rotable wheel.

In a second preferred embodiment of the invention, the poultry feces removal apparatus also includes an apparatus for moving the bird along a predetermined path. In this preferred embodiment, the poultry feces removal apparatus includes a plurality of compression assemblies, and at least two of these compression assemblies are included within a compression module that is positioned along the predetermined path. Furthermore, the clasping device is preferably configured for lateral movement relative to the compression module along the predetermined path. In this preferred embodiment of the invention, each of the compression assemblies includes a compression member for exerting force on an exterior surface of a bird's central body portion. This compression member is preferably configured to be moved along an axis that is substantially perpendicular to a top surface of the bird's central body portion. In addition, at least one compression assembly is configured to move along with (i.e. in tandem with) the clasping device while the compression assembly exerts a compressive force on the exterior surface of the bird.

The compression assembly of the second preferred embodiment of the invention preferably includes a compression member that is configured to conform to an exterior surface of a bird's chest. In a preferred embodiment of the invention, the compression member is substantially in the shape of a portion of the exterior surface of a bird's chest. Such a compression member is preferably concave and shaped to receive a portion of a bird's chest within the concave interior of the compression member.

The compression assembly also preferably includes an alignment device that is configured to allow the compression member to shift its orientation (i.e. shift the direction in which the open concave portion of the compression member is facing) to a limited extent so that, as the compression member exerts a compressive force on the exterior of the bird, the lower surface of the compression member generally aligns with the exterior surface of the bird. In a preferred embodiment of the invention, this alignment device comprises: (1) a support plate defining an alignment opening; (2) an alignment pin adjacent to, and extending away from, the upper surface of the compression member, and extending through the alignment opening; and (3) a flexible stabilizing member that is disposed between a portion of the alignment pin and an interior portion of the alignment opening, so that as the compression member is moved relative to the exterior surface of the bird, the compression member is maintained in general alignment with the exterior surface of the bird, but is free to shift slightly to register with the exterior surface of the bird as the compression member exerts a compressive force on the exterior surface of the bird.

In a preferred embodiment of the invention, the compression assembly is configured to exert a compressive force on the a bird while the bird's body is maintained in a substantially horizontal position, and while the bird's feet extend upwardly relative to the bird's body. This allows the apparatus to squeeze feces from the bird with minimal risk of the feces coming in contact with the exterior surface of the bird.

The invention further includes methods of removing feces from a bird. A first of these methods includes the steps of: (1) providing a bird; (2) using an automated device to squeeze the bird; and (3) while squeezing the bird, exerting a first discrete compressive force on an exterior surface (and preferably a top surface) of the bird that is sufficient to force feces out of the bird's body. In a preferred embodiment of the invention, this method further includes the steps of: (4) providing a first side member and a second side member, the first and second side members being operable to squeeze the bird; (5) providing a compression member for exerting said first discrete compressive force on said exterior surface of the bird; and (6) moving the bird, the first side member, the second side member, and the compression member at substantially the same speed while squeezing the bird and while exerting the first discrete compressive force on the exterior surface of the bird. The step of using an automated device to squeeze the bird preferably comprises applying a first amount of pressure to opposing first and second sides of the bird, and the step of exerting a first discrete compressive force on an exterior surface of the bird's body preferably includes exerting the first discrete compressive force on a third side of the bird.

The above inventive method of removing feces from a bird preferably also includes the steps of: (1) applying a second amount of pressure to opposing first and second sides of the bird, the second amount of pressure being greater than the first amount of pressure; and (2) while applying the second amount of pressure, exerting a second discrete compressive force on the third side of the bird, the second discrete compressive force being sufficient to force feces out of the body of the bird; (3) applying a third amount of pressure to opposing first and second sides of the bird, the third amount of pressure being greater than the first amount of pressure and the second amount of pressure; and (4) while applying the third amount of pressure, exerting a third discrete compressive force on the third side of the bird, the third discrete compressive force being sufficient to force feces out of the body of the bird.

The invention further includes a method of removing feces from a bird that includes the steps of: (1) providing a chicken that has not yet been defeathered; (2) providing an automated feces removal device that is operable to remove feces from the bird, before the bird has been defeathered, by simultaneously applying force to three different sides of the bird; and (3) using the automated feces removal device to remove feces from the bird. In a preferred embodiment of the invention, the step of using the automated feces removal device to remove feces from the bird occurs when the bird is in a substantially horizontal position. In an alternative embodiment of the invention, the step of using the automated feces removal device to remove feces from the bird occurs when the bird is in a substantially vertical position in which the bird's feet are positioned below the bird's body.

An advantage of the present invention is that it provides methods and apparatuses for removing feces from a bird with minimal potential for soiling the bird with the feces. This is due to the fact that the apparatus removes feces from the bird before the bird has had its feathers removed and while the bird is in a substantially horizontal position. Positioning the bird horizontally before squeezing feces from the bird's anus allows the feces to fall away from the bird under the force of gravity. Removing feces from the bird before the bird has been defeathered further reduces the potential for soiling the bird with feces. This is due to the fact that the any feces that splatters onto the bird will come to rest on the bird's feathers, rather than on the bird's skin. Thus, the feathers provide a protective barrier between the bird's skin and potential contaminants.

A further advantage of the present invention is that, by progressively squeezing the sides of the bird and applying multiple discrete forces to a top surface of the bird as pressure is applied to the sides of the bird in varying amounts, the apparatus is able to force almost all of the feces out of the bird. This greatly reduces the risk that the bird will be contaminated with feces as the bird is processed later.

BRIEF DESCRIPTION OF THE DRAWINGS

The above features, and advantages of the invention will become more apparent from the following description of certain preferred embodiments of the invention, when taken in conjunction with the accompanying drawings in which:

FIG. 23A is a pictorial view of the of the compression module of FIG. 20.

DETAILED DESCRIPTION OF THE INVENTION

Figure 1:
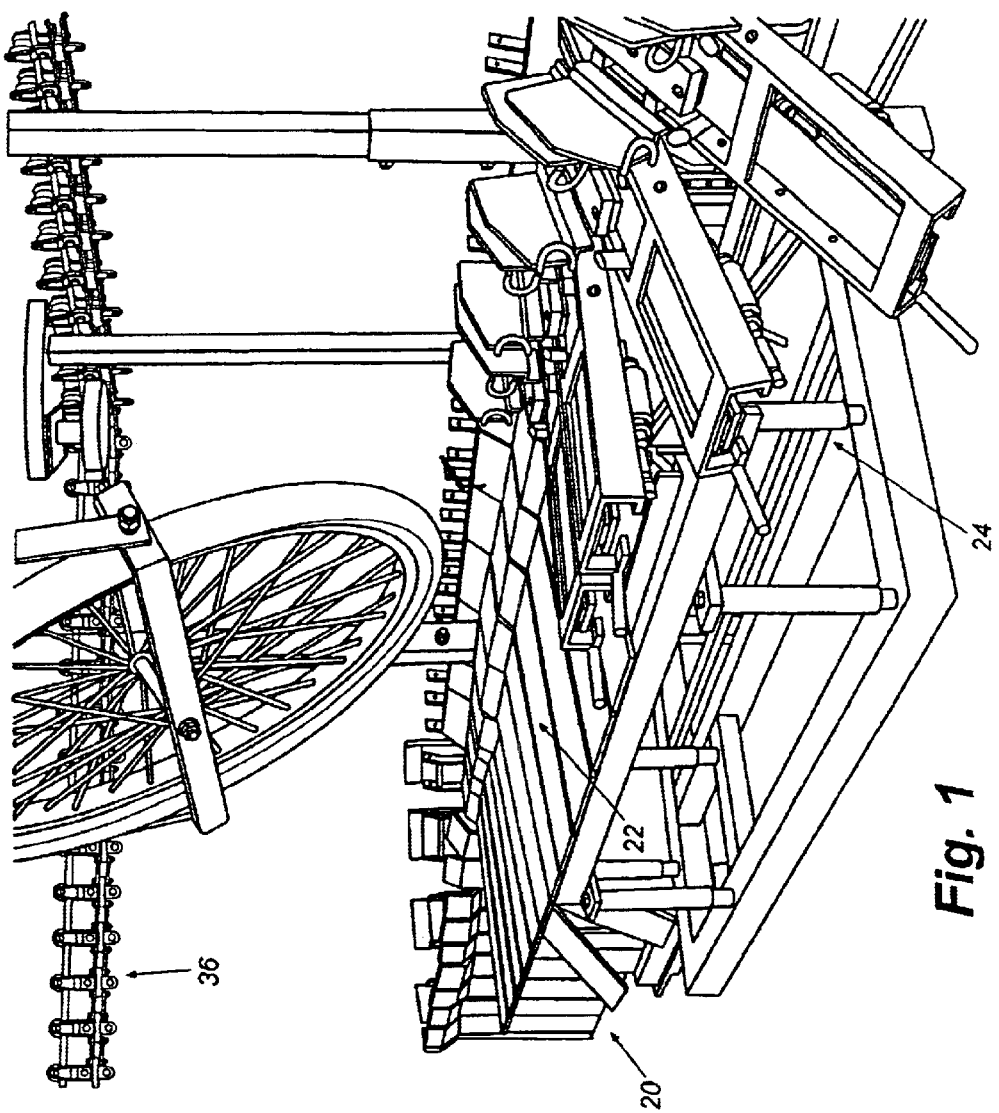
FIG. 1 is a pictorial view of a poultry feces remover according to a preferred embodiment of the present invention as seen from a down-stream view.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Definitions

As used in this patent application, the term "bird" refers specifically to a chicken, turkey, duck, quail, goose, pheasant, or any other sort of bird. Such a bird generally has a an elongated central body portion, a head that extends from the upper end of the elongate central body portion, and feet that extend from the lower end of the elongate central body portion. Such a bird generally has four discrete "sides" that include the front surface of the bird's central body portion, the back surface of the bird's central body portion, and the two opposing side surfaces of the bird's central body portion. A "top surface" of a bird means either the front surface of the bird's central body portion, or the back surface of the bird's central body portion.

General Location of the Poultry Feces Removal Apparatus

In a typical poultry processing line, a bird goes through the following processing stations: (1) a stunner station at which the bird is stunned; (2) a killing station at which the bird's throat is slit; (3) a bleed station at which blood from the bird is allowed to drain into a trough; (4) a scalding station at which the bird is submerged in hot, agitated water to loosen its feathers for removal; (5) a picking station at which the bird's feathers are removed; (6) a decapitation station at which the bird's head is removed; (7) a hock cutter station at which the bird's feet are removed; (8) a rehanging station at which the bird is moved from a picking line to an evisceration line; (9) a vent cutter station at which a hole is cut into the anus of a bird; (10) an opener station at which the bird is cut to open the bird's abdominal cavity; (11) an evisceration station at which the bird's entrails are removed; and (12) an inspection station at which the bird and its entrails are inspected.

Typically, the risk of feces contamination is greatest at the scalder station, the picking station, the rehanging station, the vent cutter station, and the evisceration station because the bird's feces are often inadvertently released from the bird at these stations. This may contaminate the bird or other birds. By removing a bird's feces in advance of these processing stations, as per a preferred embodiment of the invention, the risk of inadvertent release and possible contamination is reduced because, after the bird is processed according to the preferred embodiment, little to no feces remains in the bird. Thus, an aspect of a preferred embodiment of the present invention comprises positioning the inventive poultry feces remover apparatus after the bleeding station and before the scalder so that substantially all of the bird's feces is removed before the bird's feathers are removed. Although this is a preferred location for the poultry feces removal apparatus, the poultry feces removal apparatus of the present invention may be located at other positions in the poultry processing line, and is not limited to the preferred location.

Overview of the Poultry Feces Removal Apparatus

Figure 12:
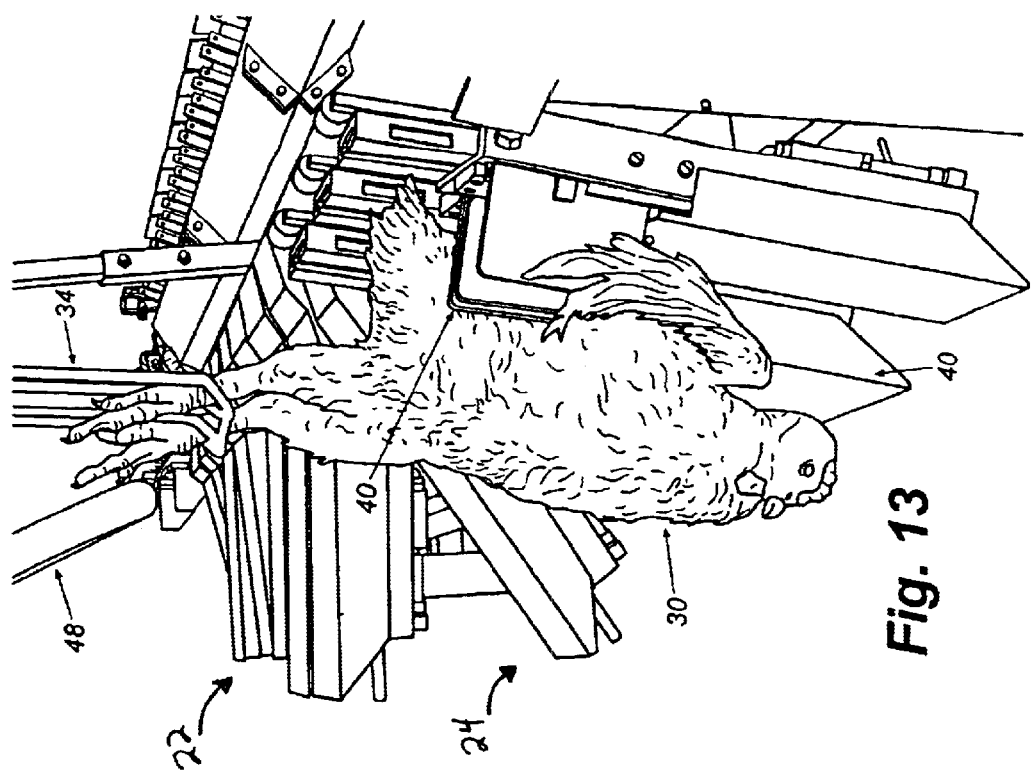
FIG. 12 is a pictorial view of a bird and a clasping device rotating back to a hanging, substantially vertical position as per a preferred embodiment of the invention.
Figure 13:
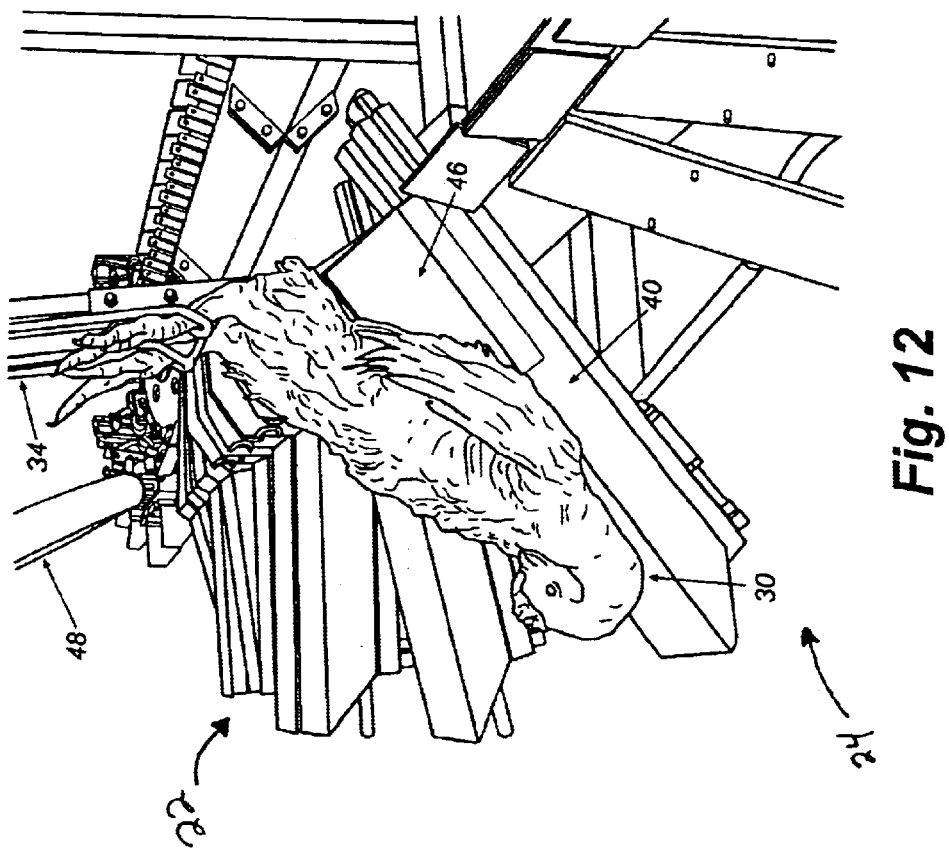
FIG. 13 is a pictorial view of a clasping device of the poultry feces remover shown in FIG. 1 as the clasping device releases the bird. This figure shows that the bird remains suspended by the suspension device as the clasping device releases the bird.

FIG. 1 shows an embodiment of a poultry feces remover apparatus according to the present invention in which a bird's feces are forcibly ejected from a bird by a compression assembly. As may be understood from FIGS. 1 and 4–7, starting at an elevation section 20, the bird 30 is gradually moved from a substantially vertical position (in which a longitudinal axis of the bird's central body portion is substantially perpendicular to the floor) into a substantially horizontal position (in which a longitudinal axis of the bird's central body portion is substantially parallel to the floor). The bird 30 is then moved through a compression section 22. As shown in FIG. 7, while moving through the compression section 22, the longitudinal axis of the bird's central body portion is substantially horizontal and the bird's feet are preferably positioned so that they extend upwardly relative to the bird's central body portion. While the bird in this position, a compressive force is applied to the bird's central body portion to remove feces from the bird 30. As shown in FIGS. 12 and 13, after the bird 30 leaves the elevation section 20, the bird 30 is returned to a substantially vertical position relative to the floor at a de-elevation section 24. FIGS. 2 through 13 depict, in a step-by-step manner, how a bird 30 is processed in a preferred embodiment of the present invention. These figures are discussed in greater detail below.

Figure 2:
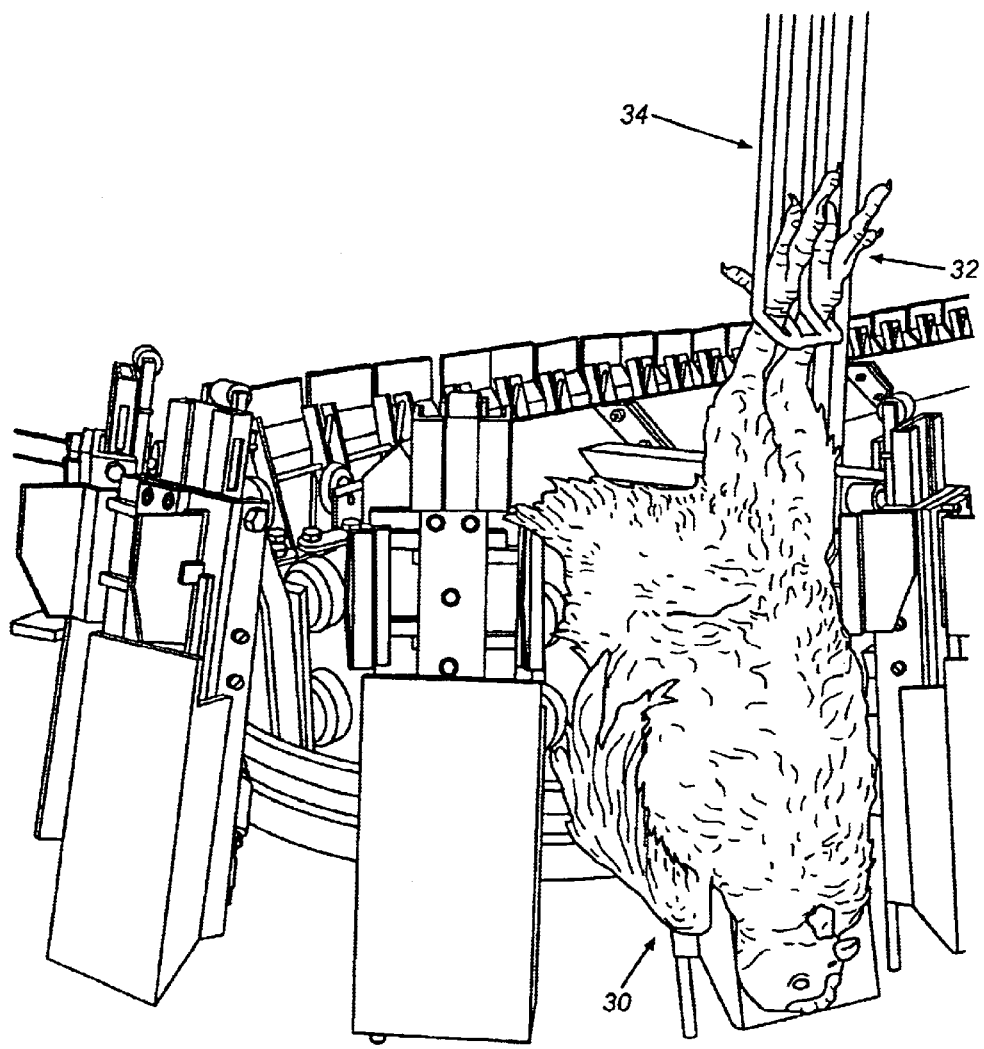
FIG. 2 is a pictorial view of the poultry feces remover of FIG. 1 in which a bird is hanging from a suspension device prior to being grasped by a clasping device.

Structure of the Poultry Feces Removal Apparatus
1. Suspension Devices and Related Conveyor FIG. 2 shows a standard, prior art suspension device 34 that is used in conjunction with a preferred embodiment of the invention. As shown in FIG. 2, a bird being processed by a feces removal apparatus according to the present invention is suspended by its feet 32 from the suspension device 34 so that the bird 30 is hanging in an inverted, substantially-vertical position.

Figure 23B:
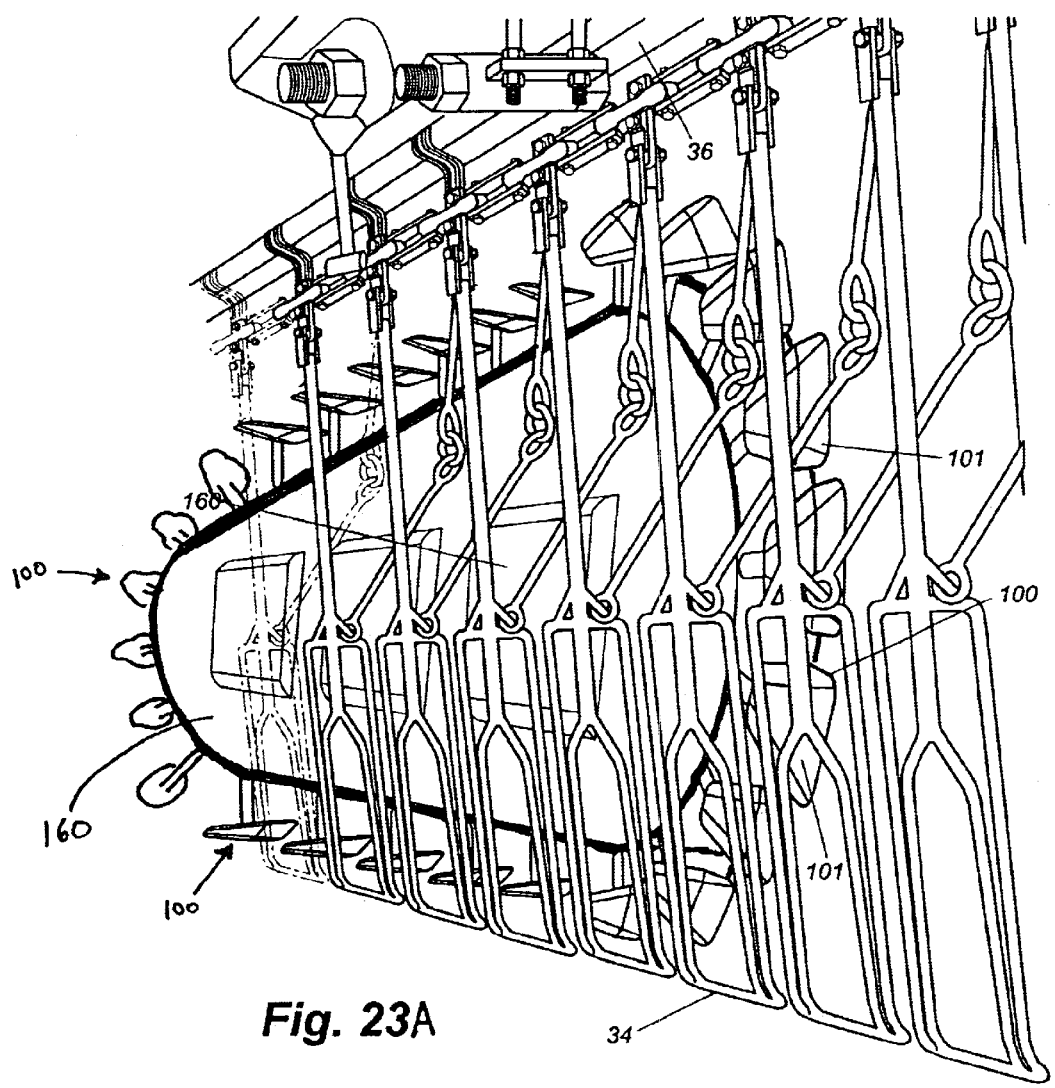
FIG. 23B is a front schematic view of the compression module of FIG. 20.
Figure 23B:
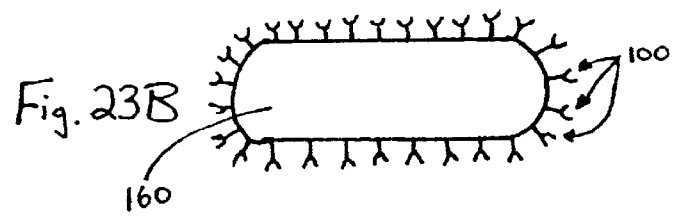
Figure 24:
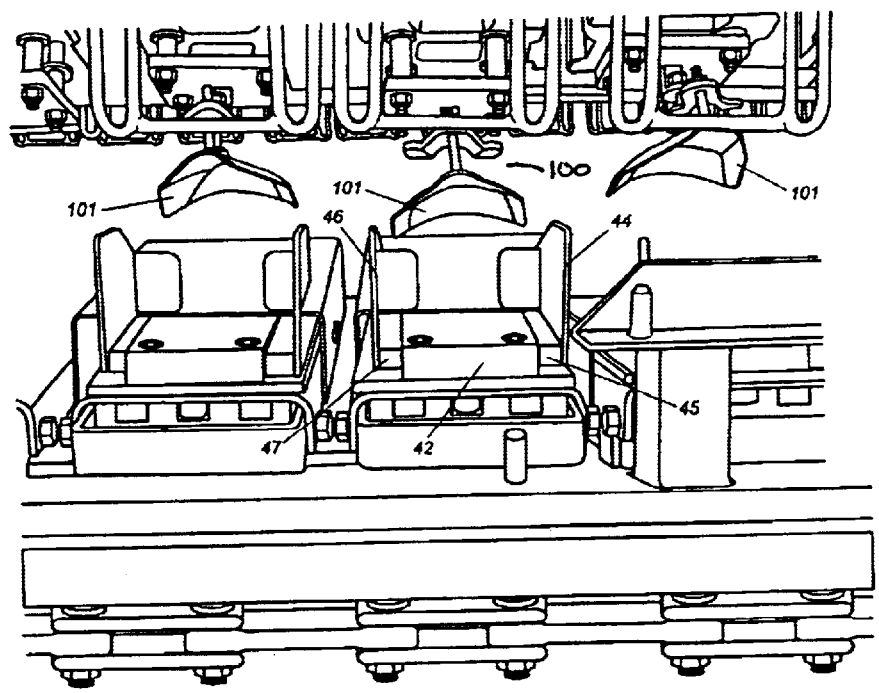
FIG. 24 is a pictorial front view of a plurality of compression assemblies and clasping devices according to a second preferred embodiment of the invention.

As will be understood by one skilled in the art, such suspension devices 34 are typically connected to a conveyor 36 (see FIG. 1) that carries the suspension device 34 (and any bird 30 suspended from the suspension device 34), through the various processing stations in the poultry processing plant. Preferably, the conveyor 36 is driven by a motor-driven chain 38 (FIG. 3) or other drive system, which is controlled by an automation device (not shown). As shown in FIG. 23, multiple suspension devices 34 may be connected to the conveyor 36 so that many birds may be simultaneously moved through the various processing stations.

The automation device that controls the conveyor's drive system automatically controls the movement of the birds 30 through the various processing stations. This automation device can include a PLC controlled automation system, a computer-controlled automation system, a hard-wired relay-type automation system, or other automatic system. Thus, considerable efficiency and cost savings are achieved by reducing the amount of human intervention necessary to coordinate the movement of the birds 30 during processing.

2. Clasping Devices and Related Drive Mechanism

General Structure of the Clasping Device

Figure 3:
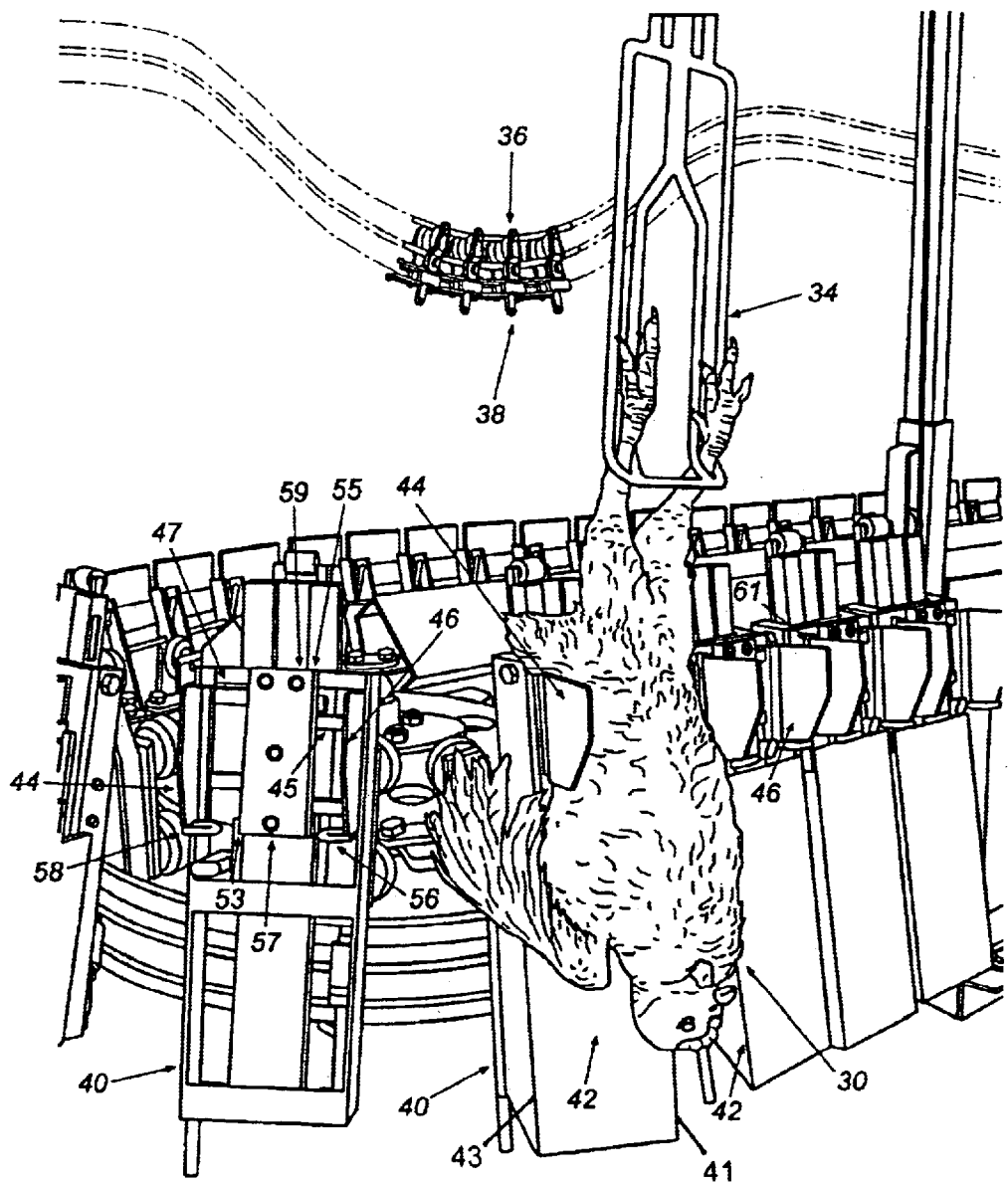
FIG. 3 is a pictorial view of the poultry feces remover of FIG. 1 in which a bird is hanging from a suspension device and in which a clasping device is in contact with the bird.
Figure 4:
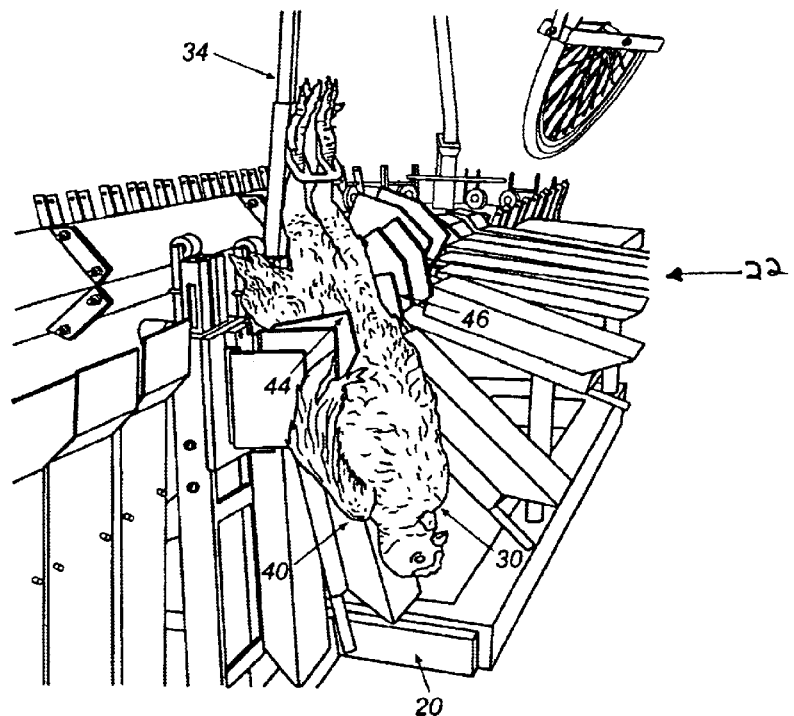
FIG. 4 is a pictorial view of the poultry feces remover of FIG. 1 in which a bird is being grasped by the clasping device as the clasping device begins to rotate the bird from a substantially vertical position to a substantially horizontal position.
Figure 5:
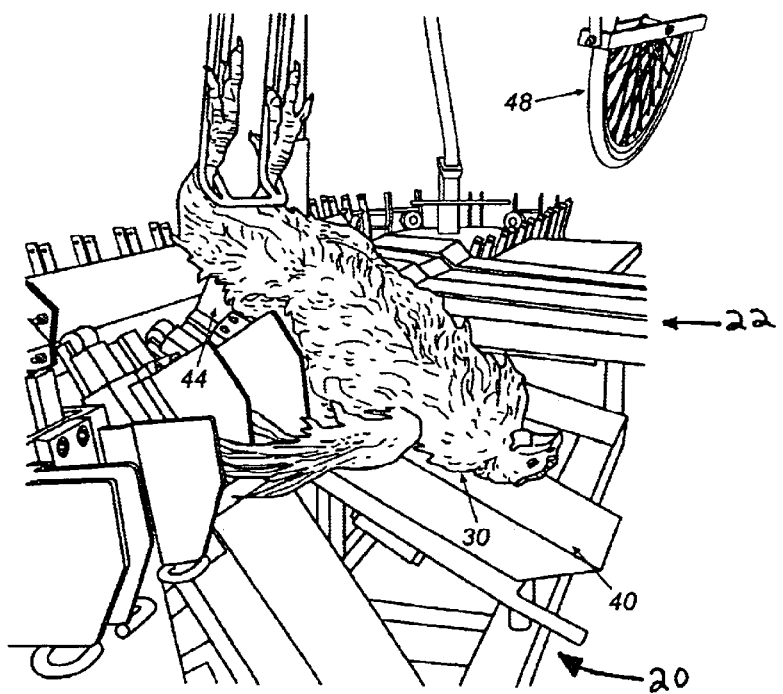
FIG. 5 is a pictorial view of the poultry feces remover of FIG. 1 in which a bird is being grasped by the clasping device as the clasping device nears a substantially horizontal position.

FIGS. 3–5 show a plurality of clasping devices 40 that are used to squeeze the bird 30 and to rotate the bird 30 from a hanging, substantially vertical position to a substantially horizontal position. In a preferred embodiment of the invention, the clasping device 40 comprises a back plate 42, right and left side plates 44, 46, right and left extension members 45, 47 and right and left squeezing members 56, 58.

The back plate 42 is substantially planar and rectangular and includes a right side edge 53, a left side edge 55, a head-end 57, and a tail-end 59. The planar side plates 44, 46 (which serve to laterally support and to squeeze the bird 30) are also substantially planar. As shown in FIG. 3, the planar side plates 44, 46 are positioned so that they are substantially perpendicular to the back plate 42. Furthermore, the planar side plates 44, 46 are positioned on either side of the back plate 42 so that the back edge 61 of each of the side plates 44, 46 is approximately co-planar with the back plate 42 and generally parallel to the right and left side edges 53, 55 of the back plate 42. The back edges 61 of the right and the left side plates 44, 46 are offset slightly from the corresponding right and left side edges 41, 43 of the back plate 42.

The right and left side plates 44, 46 are each rigidly connected to a corresponding extension member 45, 47 that extends from the inner surface of the side plate toward the back plate 42 in a direction that is perpendicular to the inner surface of the side plate. The extended end of each of these extension members 45, 47 is connected to the back plate 42 in a manner that is well known in the art and that allows the extension members to slide laterally relative to the back plate 42. Thus, the extension members 45, 47 may be used to move the side plates: either (1) laterally toward each other and toward the back plate 42; or (2) away from each other and away from the back plate 42. This allows the clasping device 40 to squeeze a bird 30 about its midsection by compressing the bird 30 between the two side plates 44, 46.

Figure 17:
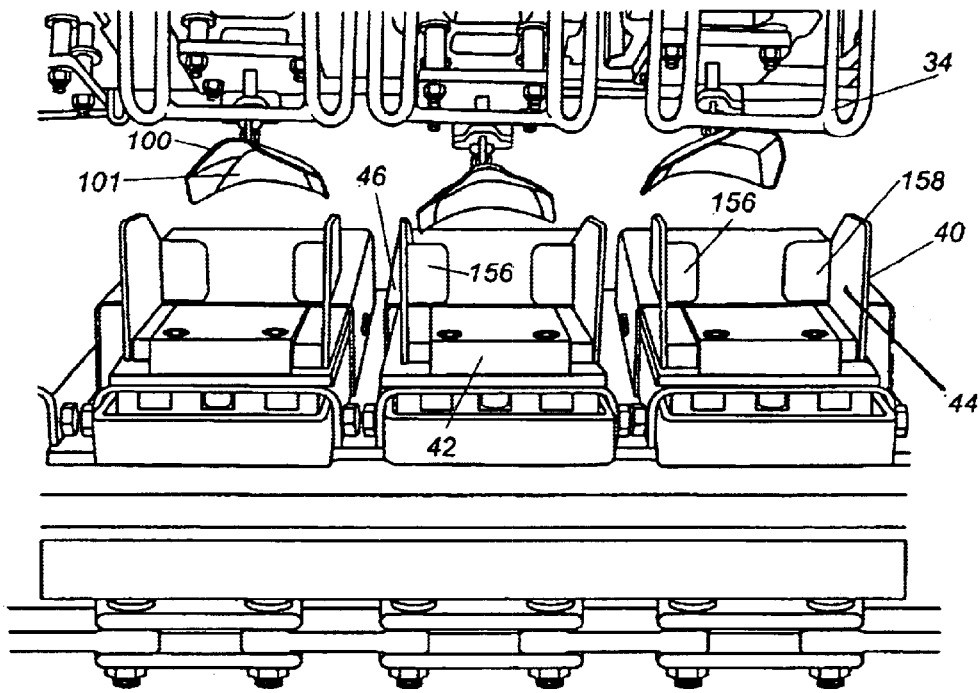
FIG. 17 is a closer pictorial front view of several compression assemblies and clasping devices according to a second preferred embodiment of the invention. This figure shows the positioning and movement of the compression members relative to the clasping devices as the clasping devices pass through the compression section.
Figure 18:
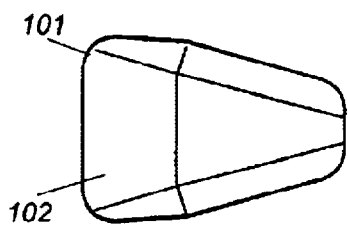
FIG. 18 is a bottom view of a compression member according to a second preferred embodiment of the invention.

A preferred embodiment of the invention also includes right and left retention members 56, 58, 156, 158 for preventing the bird 30 from sliding relative to the side plates 44, 46. These right and left retention members 56, 58, 156, 158 are preferably planar and may be, for example, in the shape of a hoop 56, 58 (see FIG. 3) or a solid plate 156, 158 (see FIG. 17). In a preferred embodiment of the invention, the right retention member 158 extends outwardly from, and substantially perpendicular to, the interior surface of the right side plate 44, and the left retention member 156 extends outwardly from, and substantially perpendicular to, the interior surface of the left side plate 46. As a result of this configuration, when a bird 30 is clasped between the two side plates 44, 46, the tips of the right and left retention members 56, 58, 156, 158 sharply engage the bird's thighs. This serves to prevent the bird 30 from moving laterally with respect to the side plates 44, 46.

Each clasping device 40 is preferably attached, via a hinged interface that is near the top of the clasping device, to a drive system. This configuration allows the drive system to move the clasping members laterally along a predetermined path. This configuration also allows the clasping devices 40 to be rotated about a horizontal axis that is near the top edge of the back plate 42 as the clasping device 40 is moved along the predetermined path. The clasping device drive system is synchronized with the suspension device drive system so that each suspension device 34 aligns with a corresponding clasping device 40, and moves along with the corresponding clasping device 40 as the suspension device (and a bird 30 suspended by the suspension device 34) passes through the poultry feces removal apparatus. This clasping device drive system preferably comprises a motor-driven chain (not shown). A speed match and proper registration between the suspension device 34 and the clasping device 40 are necessary because the bird 30 is simultaneously connected to both the suspension device 34 and the clasping device 40 as the bird 30 is moved through the poultry feces removal apparatus. Thus, any significant speed difference could result in physical damage to the bird 30. The speed match can be controlled by the automation device, a mechanical link between the conveyor 36 and the clasping device drive system, by mechanical gearing, or by other devices and methods generally known in the art.

General Structure of the Tilting Mechanism

Figure 6:
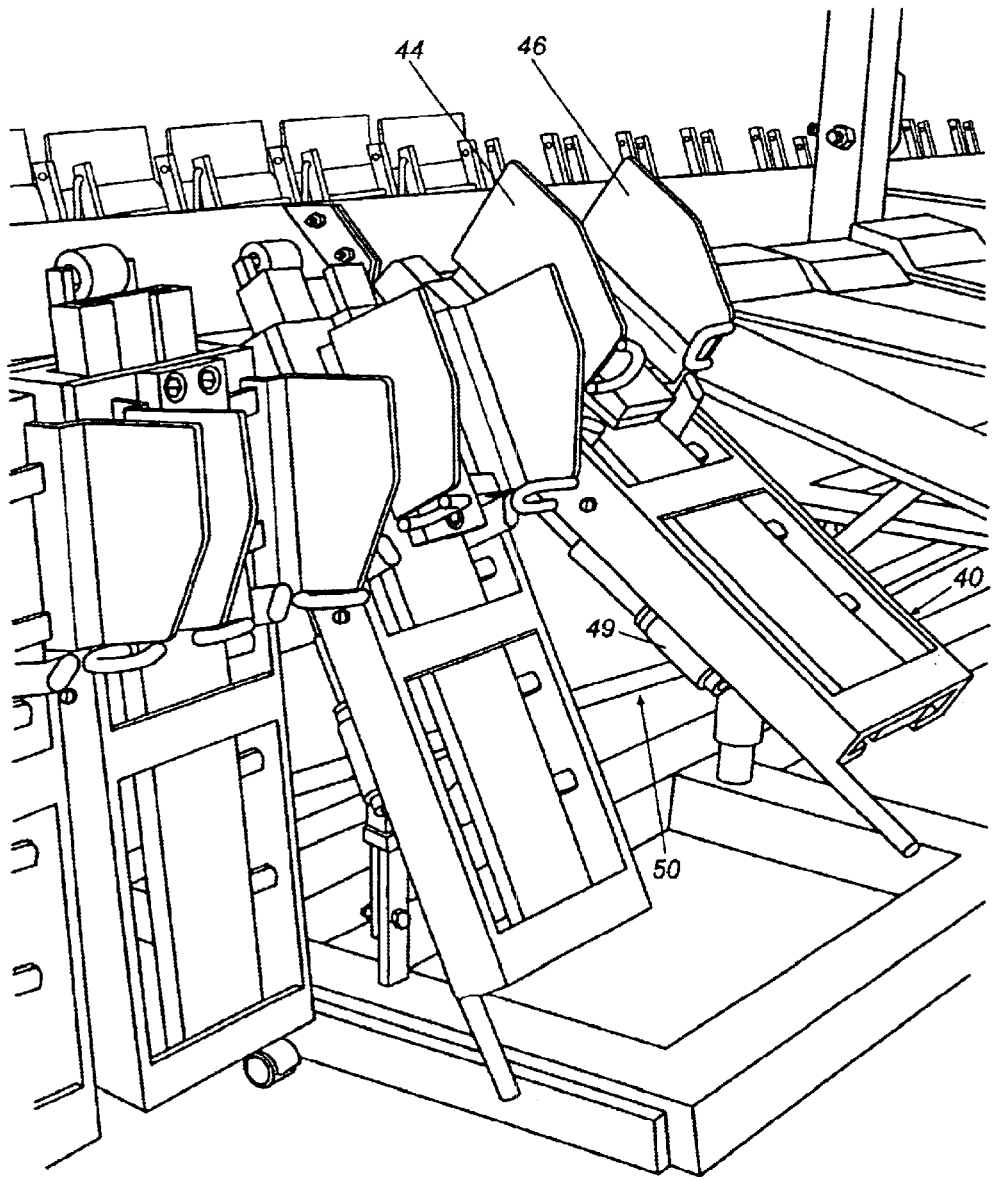
FIG. 6 is a pictorial view of the poultry feces remover of FIG. 1 showing the way in which the clasping devices of the feces remover rotate from a substantially vertical to a substantially horizontal position.
Figure 7:
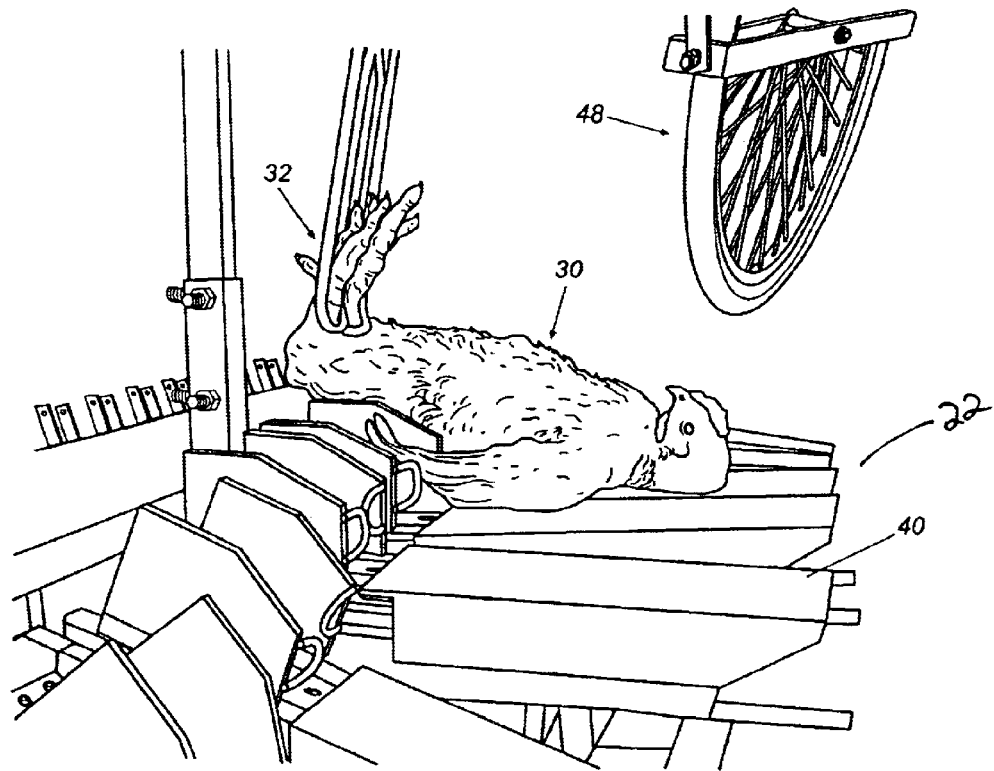
FIG. 7 is a pictorial view of the poultry feces remover of FIG. 1 in which a bird has finished rotating from a substantially vertical to a substantially horizontal position.

As shown in FIG. 6, a roller 49 is disposed on the bottom surface of the back plate 42 and spaced away from the axis of rotation of the clasping device 40 so that when the roller 49 is moved outwardly and upwardly in relation to the axis of rotation, the head-end of the clasping device 40 rotates about the axis of rotation. As shown in FIG. 6, these rollers 49 are aligned with guide rails 50 that are configured to guide the rollers 49 outwardly and upwardly relative to the axis of rotation as each clasping device 40 passes through the elevation section 30. As a result, the clasping devices 40 are rotated from a substantially vertical to a substantially horizontal position. The guide rails 50 are further configured to support the clasping devices 40 in a substantially horizontal position as the clasping devices 40 pass through the compression section 22, and to rotate the clasping devices 40 from a substantially horizontal to a substantially vertical position as the clasping devices 40 pass through the de-elevation section 24.

General Structure of the Squeezing Mechanism

Figure 8:
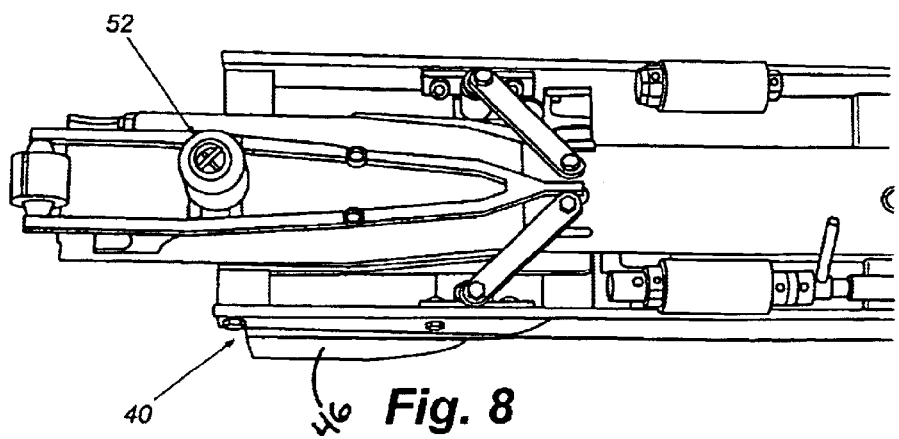
FIG. 8 is a pictorial view of the underside of a clasping device of the poultry feces remover shown in FIG. 1.
Figure 9:
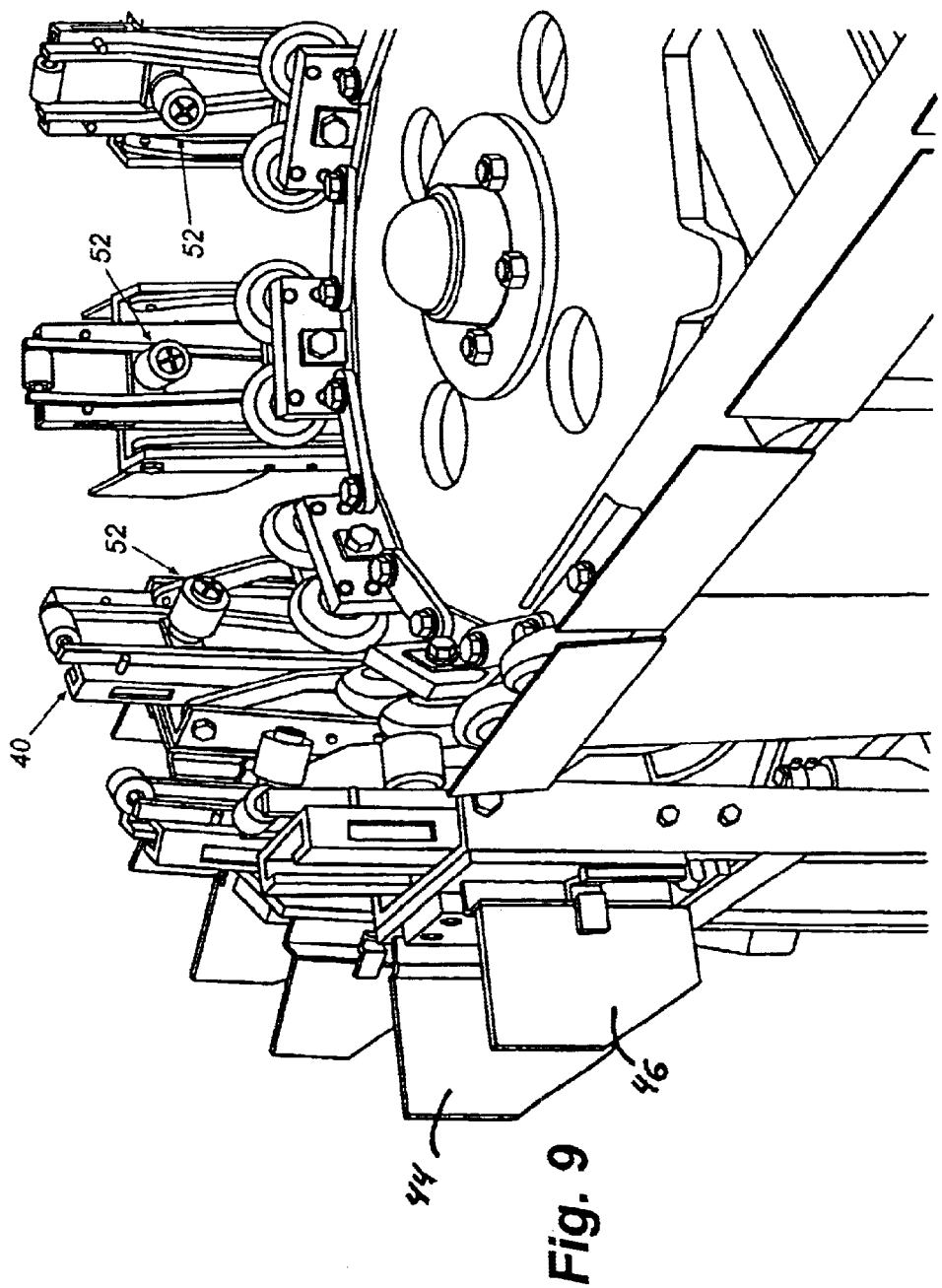
FIG. 9 is a pictorial view showing the undersides of a plurality of clasping devices of the poultry feces remover shown in FIG. 1 from a variety of different angles.

FIGS. 8 and 9 show a knob 52 located on the back side of the clasping device 40. This knob 52 is mechanically connected to the two side plates 44, 46 via a mechanical link as shown in FIG. 8 so that when the knob 52 is moved toward the head-end of clasping device 40, the two side plates 44, 46 move toward each other and, thus, squeeze the bird 30 by exerting pressure on opposite sides of the bird. Similarly, when the knob 52 is moved toward the tail-end of the clasping device 40, the two side plates 44, 46 move away from each other and, thus, decrease the pressure applied to the sides of the bird 30. The mechanical link between the knob 52 and the two side plates 44, 46 is a standard slide device.

The knob 52 is preferably moved toward the head-end of the clasping device 40 as the clasping device 40 and the bird 30 pass through the compression section 22 of the poultry feces removal apparatus. More particularly, as may be understood from FIG. 10, after the clasping 40 has been rotated into the substantially horizontal position by the guide rail 50, the knob device engages a slot 54 which receives the knob 52 at a first slot position 65*a*. When the knob 52 is positioned within the slot at this first slot position 65*a*, the knob 52 is positioned immediately adjacent to the tail-end of the clasping device 40. As the knob 52 passes through the slot 54, the slot 54 moves the knob 52 gradually toward the head-end of the clasping device 40 until the knob 52 is positioned within the slot 54 at a second slot position 65*b*. This second slot position 65*b* represents the point at which the bird 30 is squeezed by the side plates 44, 46 to the greatest extent. After the knob 52 has passed through the second slot position 65*b*, the slot 54 guides the knob 52 gradually back to a position that is immediately adjacent the tail-end of the clasping device 40. This serves to release the clasping device's grasp on the sides of the bird 30. In a preferred embodiment of the invention, the second slot position 65*b* is located immediately below the compression assembly 48 50 that the bird 30 is squeezed to the greatest extent as the bird 30 passes beneath the compression assembly 48.

General Structure of Suspension Device Lateral Movement Module

Figure 25:
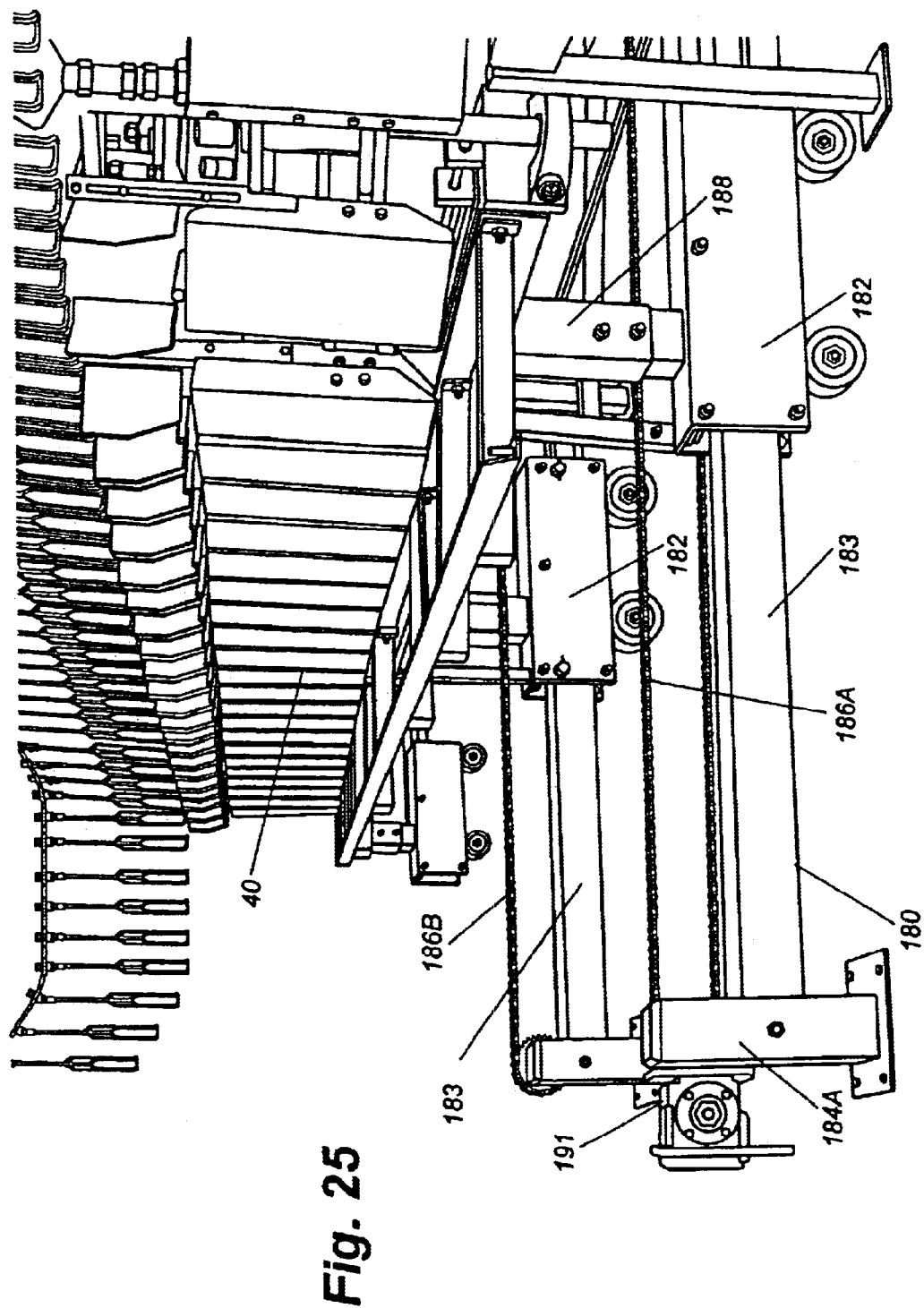
FIG. 25 is a pictorial side view of an embodiment of the invention that includes a suspension device lateral movement module.

In one preferred embodiment of the invention, the clasping devices 40 are configured to slide into and out of engagement with the rest of the poultry feces removal apparatus via a suspension device lateral movement module. As shown in FIG. 25, this is accomplished by mounting the clasping devices 40 so that they are supported by one or more vertical supports 188 that are attached to a guide sleeve 182 that is configured to slide (i.e. on rollers) along one or more horizontal support members 183. A drive mechanism 191, 186A, 186B may be used to drive guide sleeves 182 (and, thus, the vertical supports 188 and clasping devices 40) relative to the horizontal support members 183A and the rest of the poultry feces removal apparatus.

General Structure of the Compression Assembly

Figure 10:
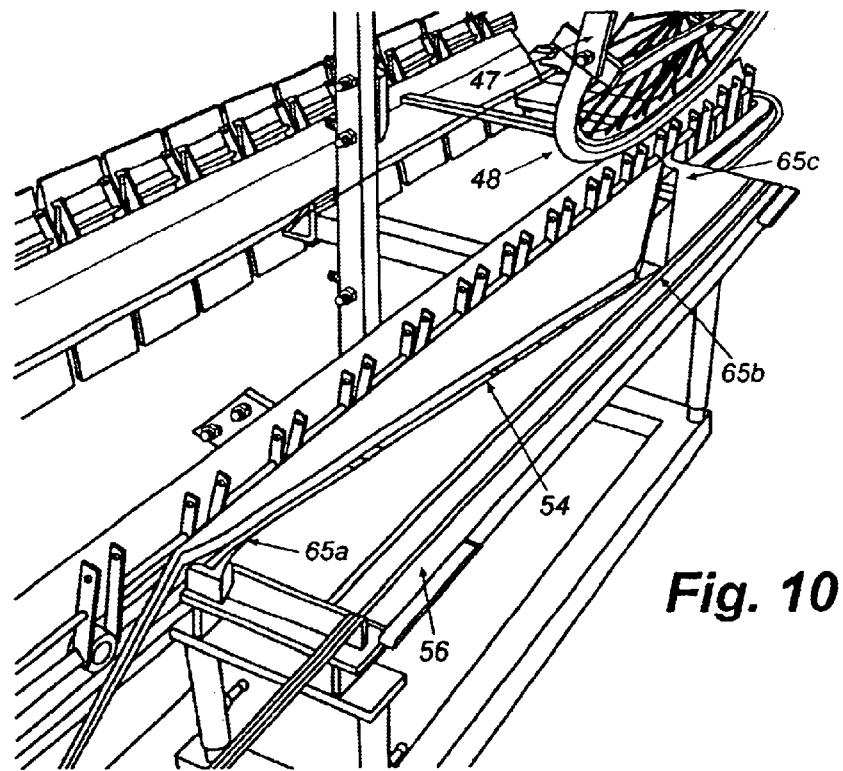
FIG. 10 shows a table of the poultry feces remover shown in FIG. 1. This table supports clasping devices as the clasping devices pass through the compression section. The table also contains a slot for actuating a knob on the back of the clasping device.
Figure 11:
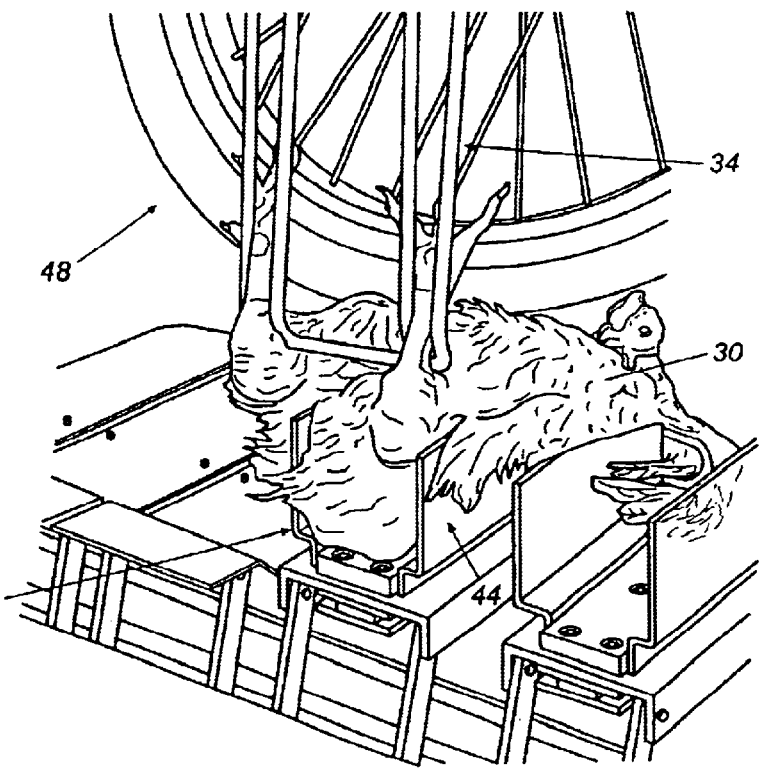
FIG. 11 is a bottom view of a bird as the bird passes under the compression assembly of the poultry feces remover shown in FIG. 1.

As shown in FIGS. 10 and 11, in a first preferred embodiment of the invention, the compression assembly comprises a wheel 48 and a wheel hanging bracket 47 for supporting the wheel 48 in a substantially vertical orientation. The wheel 48 is preferably positioned so that the bottom of the wheel is spaced approximately six inches apart from the back plate 42 of a clasping device 40 as the clasping device 40 passes over the second slot position 65*b*, discussed above. In this position, when a bird 30 and clasping device 40 pass beneath the wheel 48, the wheel 48 rotates along a top surface (and preferably the front surface) of the bird's central body portion and applies a downward force on the top surface of the bird 30. The wheel 48 may be fixed or spring loaded so that it moves slightly away from the clasping device 40 as the clasping device 40 and the bird 30 within the clasping device 40 pass beneath the wheel 48.

Other embodiments of compression assemblies can readily be conceived for exerting a compressive force on the bird 30. For example, the compression assembly could be a wheel that rotates in a direction perpendicular to the direction of the movement of the bird 30 such that the compressive force is exerted from the head of the bird 30 to the anus of the bird 30. Another possible compression assembly could comprise a wheel that is mechanically designed to rotate at a speed proportional to the speed of the conveyor 36. Other relatively simple devices for exerting the compressive force on the bird 30 can readily be conceived by those skilled in the art. A more complex automated device for applying compressive forces to a top surface of a bird 30 is described below in regard to a second preferred embodiment of the invention.

Operation of the Poultry Feces Removal Apparatus

To use the poultry feces removal apparatus, a bird 30 is first hung by its feet 32 in an inverted position (as shown in FIG. 2) from a suspension device 34 and moved along a predetermined path via a conveyor 36 as is known in the art. As the bird 30 approaches the feces removal apparatus, the bird 30 is positioned as shown in FIG. 3 so that the back of the bird 30 is aligned with the back plate 42 of the clasping device 40 and so that the back plate 42 engages the back side of the bird 30 near the midsection of the bird 30. In this position, the two side plates 44, 46 of the clasping device 40 loosely engage the sides of the bird 30. The suspension device 34 and the clasping device 40 are then moved in tandem along the predetermined path so that the suspension device 34 supports the weight of the bird 30 and so that the clasping device 40 supports the bird 30 laterally.

As shown in FIGS. 4–6, the bird 30 is then moved through the elevation section 20, where the bird 30 and the clasping device 40 are rotated from a hanging, substantially vertical position, to a substantially horizontal position. As noted above, this rotation is caused by guide rails 50 (see FIGS. 5 and 6) that rotate the clasping device 40 about a horizontal axis adjacent the tail-end portion of the clasping device 40. Preferably, the bird 30 is rotated to a substantially horizontal position in which the suspension device 34 elevates the bird's legs slightly over the bird's body as shown in FIGS. 7 and 11. At all times during this process, the clasping device 40 remains connected to the clasping device drive system.

Although the preferred embodiment of the present invention teaches rotating the bird 30 to a substantially horizontal position, the bird 30 may be rotated beyond a horizontal position and into a more substantially vertical position in which the bird's head is above the bird's feet. By rotating the bird 30 beyond the horizontal position, the feces of the bird 30 may still be forcibly ejected with a minimal likelihood of contact with the external surface of the bird 30.

Once the clasping device rotates the bird 30 to a substantially horizontal position, the two side plates 44, 46 are moved toward one another as described above to gradually squeeze the bird 30. Although the preferred embodiment of the present invention teaches first rotating the bird 30 and then squeezing the bird 30 with the two side plates 44, 46, alternative embodiments may comprise squeezing the bird 30 while simultaneously rotating the bird 30, or squeezing the bird 30 first and then rotating the bird 30. Squeezing the sides of the bird 30 serves to support the bird 30 laterally, and to prevent the bird's feces from being pushed to the sides of the bird 30 rather than out of the bird's anus as the bird 30 is compressed. In addition, squeezing the bird 30 may serve to loosen the feces within the bird's intestines. It is important to note, however, that the bird 30 should not be squeezed too hard or the bird 30 may suffer undesirable damage.

After the bird 30 is rotated into a substantially horizontal position, the bird 30 is moved under a compression assembly 48 as shown in FIG. 11. As noted above, in this embodiment of the invention, as the bird passes under the compression assembly 48, the two side plates 44, 46 preferably apply a maximum amount of pressure to the sides of the bird 30. As the bird 30 moves below the compression assembly 48, the compression assembly 48 exerts a downward force on a top surface (and preferably the front surface) of the bird's central body portion. This causes feces to be forced out of the bird's anus. In the embodiment of the invention shown in FIG. 11, the compression assembly 48 rotates over the midsection of the bird 30 in a direction parallel to the movement of the bird 30 along the conveyor 36. As may be understood from FIGS. 7 and 11, because the bird 30 is lying on its back and has its legs slightly elevated during compression, the likelihood of the forcibly ejected feces coming into contact with the external surface of the bird 30 is substantially reduced.

As force is applied to the top surface of the bird's central body portion, the clasping device 40 serves as a back support for the bird 30. Supporting the back of the bird 30 with a rigid support while squeezing the sides of the bird 30 with side plates 44, 46 as the bird 30 passes beneath the compression assembly 48 helps to flush the majority of the bird's feces out of the bird's anus.

After the bird 30 has passed beneath the compression assembly 48, the two side plates 44, 46 release their squeeze on the bird 30 as the knob 52 on the back of the clasping device 40 moves from the second slot position 65b to the third slot position 65c as discussed above in reference to FIG. 10. The clasping device 40 then passes through the de-elevation section 24, where the clasping device 40 and the bird 30 are rotated back into a hanging, substantially vertical position as shown in FIG. 12.

The bird 30 then separates from the clasping device 40 as shown in FIG. 13 and remains suspended by its feet 32 from the suspension device 34. The bird 30 is then carried to another processing station for further processing. The clasping device 40 is then moved along an endless loop and positioned to grasp another bird 30 and to repeat the process as desired.

After the bird 30 separates from the clasping device 40, and before the clasping device 40 grasps another bird, the clasping device 40 may be cleansed by a spray nozzle (not shown) or other device for cleaning off any feces which may have fallen upon or come into contact with the clasping device 40. Although not shown, such devices for cleaning off feces are readily known in the art and easily adapted for the present invention.

Figure 14:
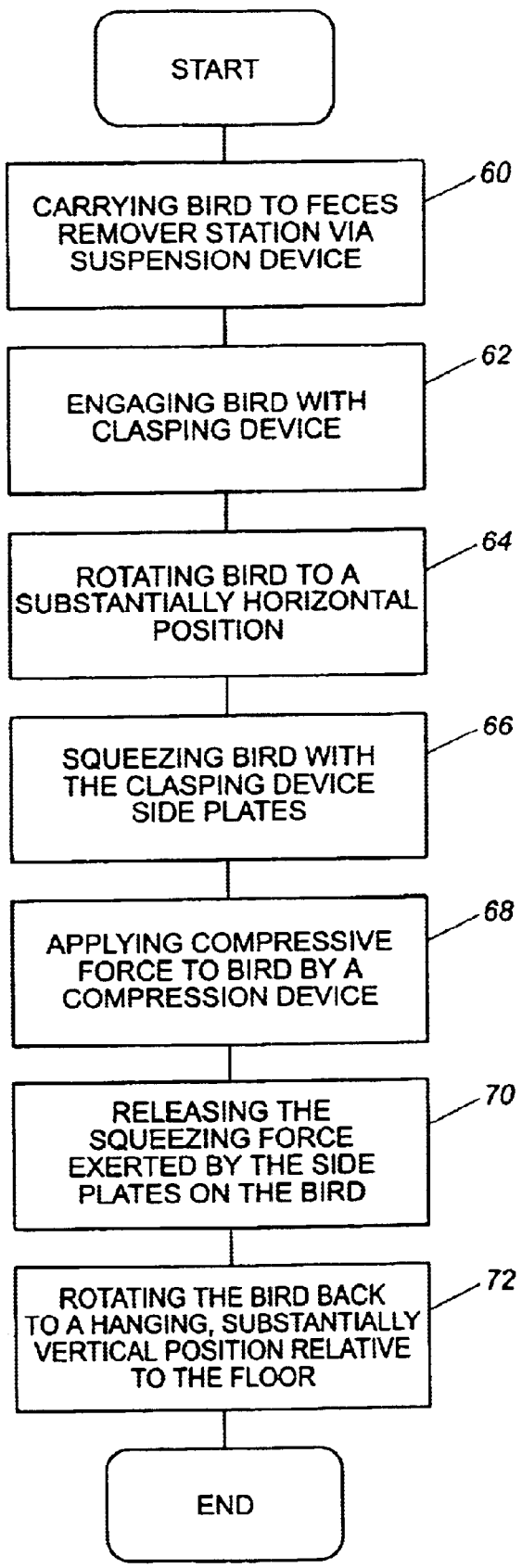
FIG. 14 is a flow diagram of a method according to a first preferred embodiment of the present invention.

The operation of the above-described first embodiment of the poultry feces remover is summarized in FIG. 14. First, as depicted in Block 60, a bird is carried by a suspension device to the feces remover station of the present invention. Next, as shown in Block 62, the bird is engaged by a clasping device.

After the bird is engaged by the clasping device, the clasping device is rotated to a substantially horizontal position as depicted in Block 64, and then the side plates of the clasping device squeeze the bird, as indicated in Block 66. A compressive force is then applied to the top surface of the bird's central body portion by a compression assembly, as depicted in block 68. Next, the squeezing force exerted by the side plates on the bird is released, as indicated in Block 70 and the bird is rotated back to a hanging, substantially vertical position as indicated in Block 72.

It is important to note that the steps depicted by Blocks 64 and 66 may, in an alternative embodiments, occur simultaneously. In such an embodiment, the bird 30 is rotated and squeezed at the same time. Also, the steps depicted by Blocks 64 and 66 may take place in reverse order so that the bird is squeezed prior to being rotated.

Structure and Operation of a Second Preferred Embodiment

In a second preferred embodiment of the invention, the general structure and operation of the poultry feces removal apparatus is generally the same as in the first preferred embodiment described above, except that an automated compression module 160, rather than a mounted wheel, is used to apply compressive forces to a top surface of each of the various birds 30 as they pass through the system. Such a compression module 160 is shown in FIGS. 15–17, 20, 23A and 23B. As may be understood from FIGS. 16 and 17, the compression module 160 is positioned above the compression section 22 of the poultry feces removal apparatus and comprises a plurality of independent compression assemblies 100 that are connected to an endless conveyor (not shown). As is shown in FIG. 16, as each clasping device 40 passes underneath the compression module 160, a corresponding compression assembly 100 is positioned directly above the clasping device 40. The compression module 160 is configured to move each compression assembly 100 in tandem along with its corresponding clasping device 40. Furthermore, each compression assembly 100 is configured to apply three discrete compressive forces to a top surface of a bird's central body portion as the bird passes through the apparatus.

In this embodiment of the invention, the side plates 44, 46 (See FIG. 17) of the clasping device 40 are gradually moved closer together as the three discrete compressive forces are applied to a top surface (and preferably the front surface) of the bird's central body portion. This causes the amount of pressure applied to the sides of the bird 30 to increase between the first and second applications of compressive force, and between the second and third applications of compressive force. Varying the amount of pressure applied to the sides of the bird 30 as various discrete compressive forces are applied to a top surface (and preferably the front surface) of the bird's central body portion as described above serves to enhance the apparatus' ability to remove feces from the bird 30. The structure and operation of the second preferred embodiment of the invention are discussed in greater detail below.

1. Structure of the Second Preferred Embodiment

Figure 19:
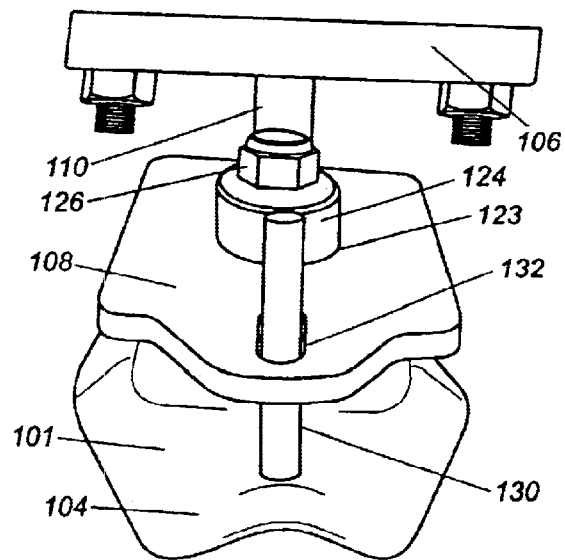
FIG. 19 is a pictorial front view of a compression assembly according to a second preferred embodiment of the invention.
Figure 20:
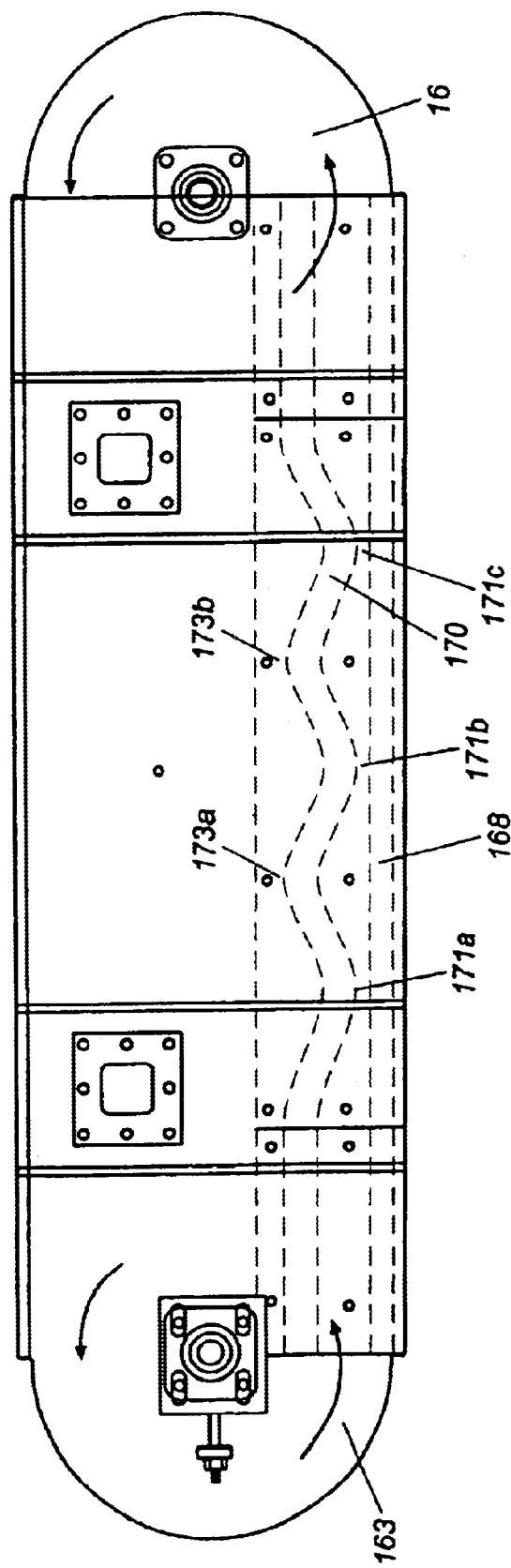
FIG. 20 is a pictorial front view of a compression module according to the second preferred embodiment of the invention. This figure shows the configuration of cams within the compression module that control the movement of the compression members relative to the various clasping devices.
Figure 22:
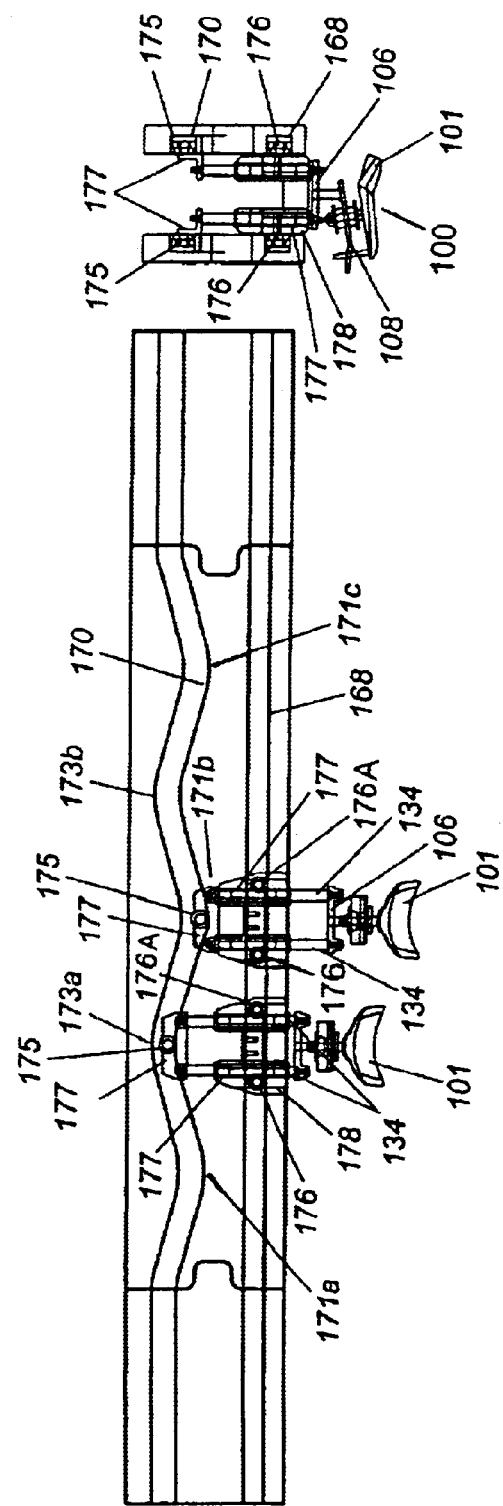

As noted above, and as may be understood from FIGS. 15, 16, 17, 23A, and 23B, the compression module 160 is positioned above the compression section 22 of the poultry feces removal apparatus and comprises a plurality of compression assemblies 100 that are connected to an endless conveyor (not shown) that positioned within the body portion of the conveyor. As may be understood from FIGS. 15, 16, and 19, each compression assembly 100 includes a generally rectangular, planar upper support plate 106 that is positioned so that, when the compression assembly 100 passes beneath the module 160, the compression assembly 100 is parallel to and spaced apart from the bottom surface of the compression module 160. As shown in FIGS. 16 and 22, an extension rod 134 extends between each corner of the upper support plate 106 and a corresponding front or rear end of one of a pair of lateral upper roller blocks 177. Each upper roller block 177 includes a centrally-disposed upper roller 175 that is positioned on the outside edge of the upper roller block 177. The upper roller blocks 177 are spaced apart and positioned so that the upper rollers 175 of the upper roller blocks 177 may roll within a pair of upper guide tracks 170 positioned within the compression module 160 on opposite lateral sides of the upper roller blocks 177. The upper guide tracks 170 include a series of peak portions 173a–b and valley portions 171a–c for moving the upper rollers 175 (and, thus, the extension rods 134 and the upper support plate 106) vertically relative to the bottom surface of the compression module 160.

As may be understood from FIG. 22, the compression assembly 100 further includes a lower roller block 178 for providing lateral support to the extension rods 134 as they move vertically relative to the compression module 160. This lower roller block 178 includes four cylindrical passages 177 that extend vertically through the lower roller block 178 adjacent the four respective corners of the lower roller block 178. Each cylindrical passage has a diameter that is slightly larger than the diameter of the extension rods 134. Accordingly, each extension rod 134 is positioned so that it extends through one of the cylindrical passages 177. Thus, the lower roller block 178 restrains the rotational movement of the extension rods 134 relative to a vertical axis while allowing the extension rods 134 to slide vertically within the cylindrical passages 177.

The lower roller block 178 also includes a pair of spaced-apart front lower rollers 176A that are positioned on opposite lateral sides of the lower roller block 178 adjacent the leading edge of the lower roller block 178. Similarly, the lower roller block 178 includes a pair of spaced-apart rear lower rollers 176 that are positioned on opposite lateral sides of the lower roller block 178 adjacent the trailing edge of the lower roller block 178. All four lower rollers 176 are dimensioned to roll within a pair of straight, substantially horizontal lower guide tracks 168 that are positioned within the compression module 160 on opposite lateral sides of the lower roller block 178. This allows the lower roller block 178 to move along a substantially horizontal path as the compression assembly 100 passes through the compression section 22.

Figure 15:
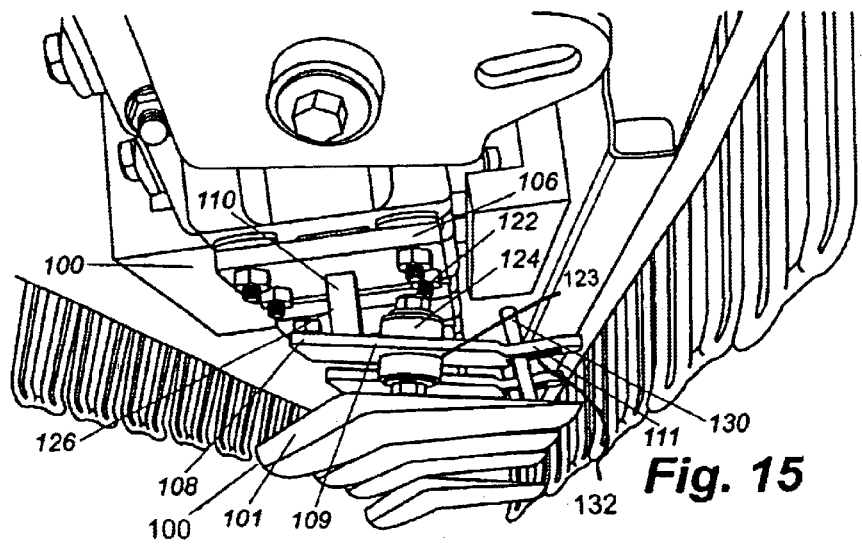
FIG. 15 is a pictorial side view of a compression assembly according to a second preferred embodiment of the invention.
Figure 16:
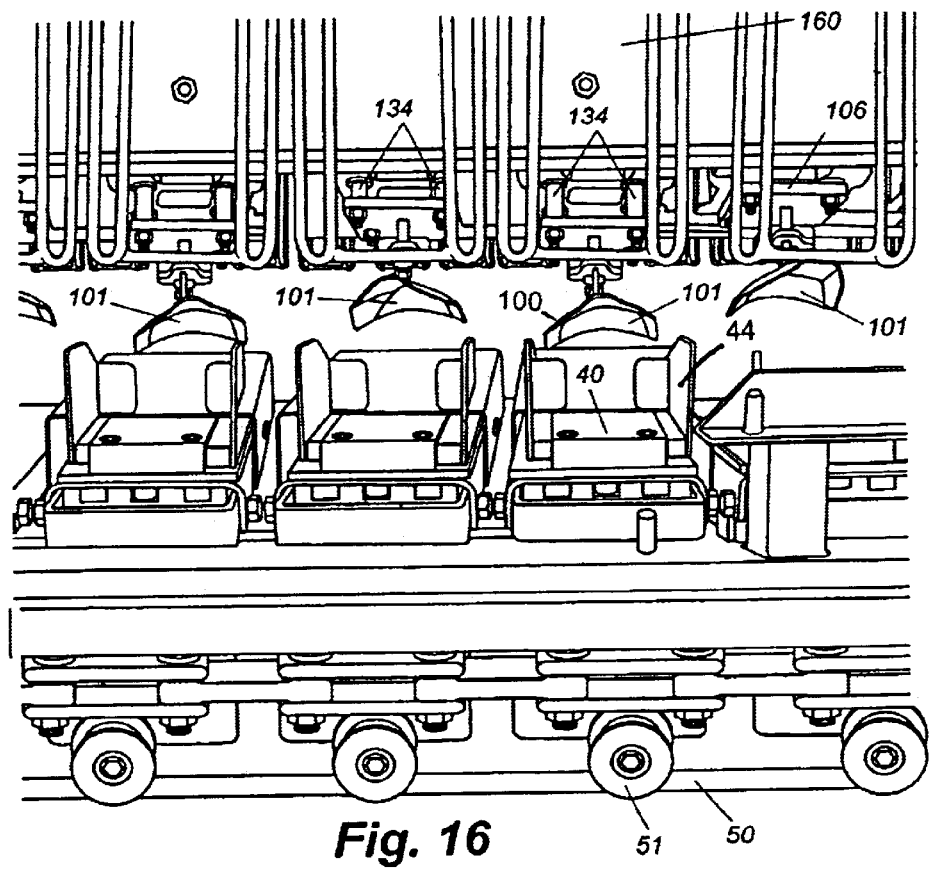
FIG. 16 is a wide pictorial front view of several compression assemblies and clasping devices according to a second preferred embodiment of the invention. This figure shows the positioning and movement of the compression members relative to the clasping devices as the clasping devices pass through a compression section.

As may be seen from FIG. 15, the compression assembly 100 further includes a lower support plate 108 having a substantially horizontal planar rear portion 109 and an angled front portion 111 that extends slightly up and away from the planar rear portion 109 and that is positioned at a slight angle relative to the horizontal plane. The lower support plate 108 is supported by a support plate connector member 110 that extends between a central portion of the upper support plate 106 and a central rear portion of the lower support plate 108 as shown in FIG. 15. The lower support plate 108 also includes a generally circular alignment opening 123 in the central portion of the lower support plate's planar rear portion 109. In addition, the lower support plate 108 includes an elongate guide pin channel 132 in a central portion of the lower support plate's angled front portion 111. This elongate guide pin channel 132 is preferably oriented so that the major axis of the guide pin channel 132 is co-linear with the major axis of the lower support plate 108.

The compression assembly 100 further includes a compression member 101 (see FIG. 15) that is preferably concave and substantially in the shape of a portion of the exterior surface of a bird's chest. (Alternatively, this compression member may be planar, convex, or any other shape that would allow the compression member 101 to effectively exert a relatively uniform pressure on the bird's chest.) This compression member 101 is positioned below the lower support plate 108 and is preferably oriented so that the inner surface of the compression member 101 is directed downward, and so that the major axis of the compression member 101 lies substantially in a vertical plane that passes through the major axis of the upper support plate 106. The compression member 101 is supported by an alignment pin 122 that that extends substantially vertically from a central portion of the upper surface of the compression member 101 and through the alignment opening 123 in the lower support plate 108. A flexible stabilizing member 124, such as a piece of thick rubber, is positioned between the exterior surface of the alignment pin 122 and the interior surface of the alignment opening 123 and held in place by fasteners 126 above and below the flexible stabilizing member 124. This flexible stabilizing member 124 is preferably thick enough so that the frictional forces between the stabilizing member 124 and the interior surface of the alignment opening 123 are sufficient to support the weight of the compression member 101.

In a preferred embodiment of the invention, the flexible stabilizing member 124 is flexible enough to allow the compression member 101 to shift slightly in order to align with the breast portion of a bird 30. The compression member 101 preferably includes a guide pin 130 that extends upwardly from the front portion of the top surface of the compression member 101 and through the guide pin channel 132 to restrict the rotation of the compression member 101 about the alignment pin 122. This maintains the compression member 101 in general alignment with a top surface of the bird's central body portion as the bird 30 is compressed by the compression member 101. In an alternative embodiment of the invention, the compression member 101 is rigidly attached to the lower support plate 108 via a rigid connecting member. In this embodiment of the invention, the compression member 101 is not capable of shifting relative to the lower support plate 108.

Figure 21:
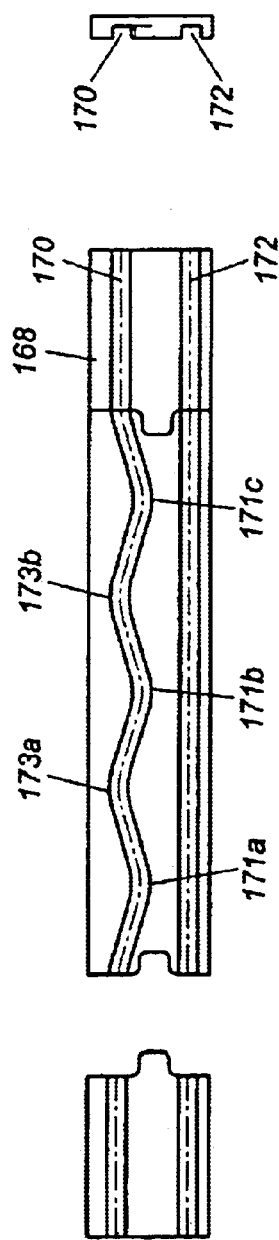
FIGS. 21 and 22 are front views of a guide member of a compression module of FIG. 20. This figure shows the configuration of cams within the compression module that control the movement of the compression members relative to the various clasping devices.

As noted above, the individual compression assemblies 100 are moved in an endless loop around the exterior of the compression module 160 by a conveyor (not shown) within the interior of the compression module 160. (See FIGS. 23A and 23B.) As may be understood from FIGS. 20–22, as the compression assemblies 100 are moved laterally around the compression module 160, upper rollers 175 roll along the upper guide track 170 as discussed above. Because the upper rollers 175 are rigidly connected to the extension rods 134, the vertical motion of the extension rods 134 mirrors the vertical motion of the upper rollers 175 as the upper rollers 175 move along the upper guide track 170. Accordingly, as the upper rollers 175 move along the upper guide track 170 through peak portions 173a–b and valley portions 171a–c, the extension rods 134 (and, thus, the compression member 101) move vertically relative to a bird 30 and a clasping device 40 along an axis that is substantially perpendicular to a top surface of the bird 30.

2. Operation of the Second Preferred Embodiment

In operation, when a bird 30 and clasping device 40 pass underneath the compression module 160, a compression assembly 100 is aligned with the clasping device 40 as shown in FIG. 16 and moved along, in tandem, with the clasping device 40. As the clasping device 40, the bird 30, and the compression assembly 100 move through the compression section 22, the side plates 44, 46 of the clasping device 40 move gradually together in the manner described above. As a result, the side plates 44, 46 apply gradually increasing pressure on the sides of the bird 30. During the passage of the clasping device 40, the bird 30, and the compression assembly 100 through the compression section 22, the upper rollers 175 of the compression assembly 100 move along the track 170 (see FIGS. 20–22) within the interior of the compression module 160. As may be understood from FIGS. 20 and 22, the compression member 101 is pressed downwardly three discrete times as the compression assembly 100 passes along the track 170. More specifically, the compression member 101 is moved downwardly at points 171a, 171b, and 171c shown in FIG. 20.

As discussed above, the side plates 44, 46 of the clasping device 40 move gradually together as the clasping device 40 passes through the compression section. As a result, while the compression member 101 applies a first compressive force to a top surface of the bird 30 at point 171a (See FIG. 22), a first amount of pressure is applied to opposing sides of the bird 30. Furthermore, when the compression member 101 applies a second compressive force to a top surface of the bird 30 at point 171b, a second amount of pressure (which is greater than the first amount of pressure) is applied to the opposing sides of the bird 30. Finally, when the compression member 101 applies a third compressive force to a top surface of the bird 30 at point 171c, a third amount of pressure (which is greater than the second amount of pressure) is applied to the opposing sides of the bird 30. This process serves to force substantially all of the feces out of the bird's intestines. After the compression member 101 has exerted pressure on a top surface (and preferably the front surface) of the bird 30 three times, the compression member is moved up and around the end of the compression module 160 and moved along a continuous loop to process another bird 30.

It is important to note that, while the above second preferred embodiment is described as applying three discrete compressive forces to a top surface of the bird 30, the system could be easily configured to compress a top surface of the bird 30 less than three times, or more than three times. Such a modification could be easily accomplished by one skilled in the relevant art. Similarly, the system could also be configured so that the discrete compressive forces differ in magnitude. (For example, the system could be configured so that the first compressive force is greater than the second compressive force, but less than the third compressive force.) To accomplish this, the system could be modified to appropriately change the vertical distance through which the compression members 101 move during each compression or the rate at which the compression members 101 move relative to the top surface of the bird 30. Such changes could be easily accomplished by modifying the configuration of the track 170 in a manner well known in the art.

Similarly, the system could be modified to adjust the amount of pressure applied to the sides of the bird 30 as the bird 30 passes through the compression section 22. For example, the system could be modified so that the pressure applied to the sides of the bird 30 while the first compressive force is applied to a top surface of the bird 30 is less than the pressure applied to the sides of the bird 30 while the second compressive force is applied to a top surface of the bird 30, but greater than the pressure applied to the sides of the bird 30 while the third compressive force is applied to a top surface of the bird 30.

By the same token, the system could be configured so that the various compressive forces are applied to different sides of the bird 30. For example, the first and third compressive forces might be applied to the front surface of the bird 30, and the second compressive force might be applied to the back surface of the bird 30.

Figure 26:
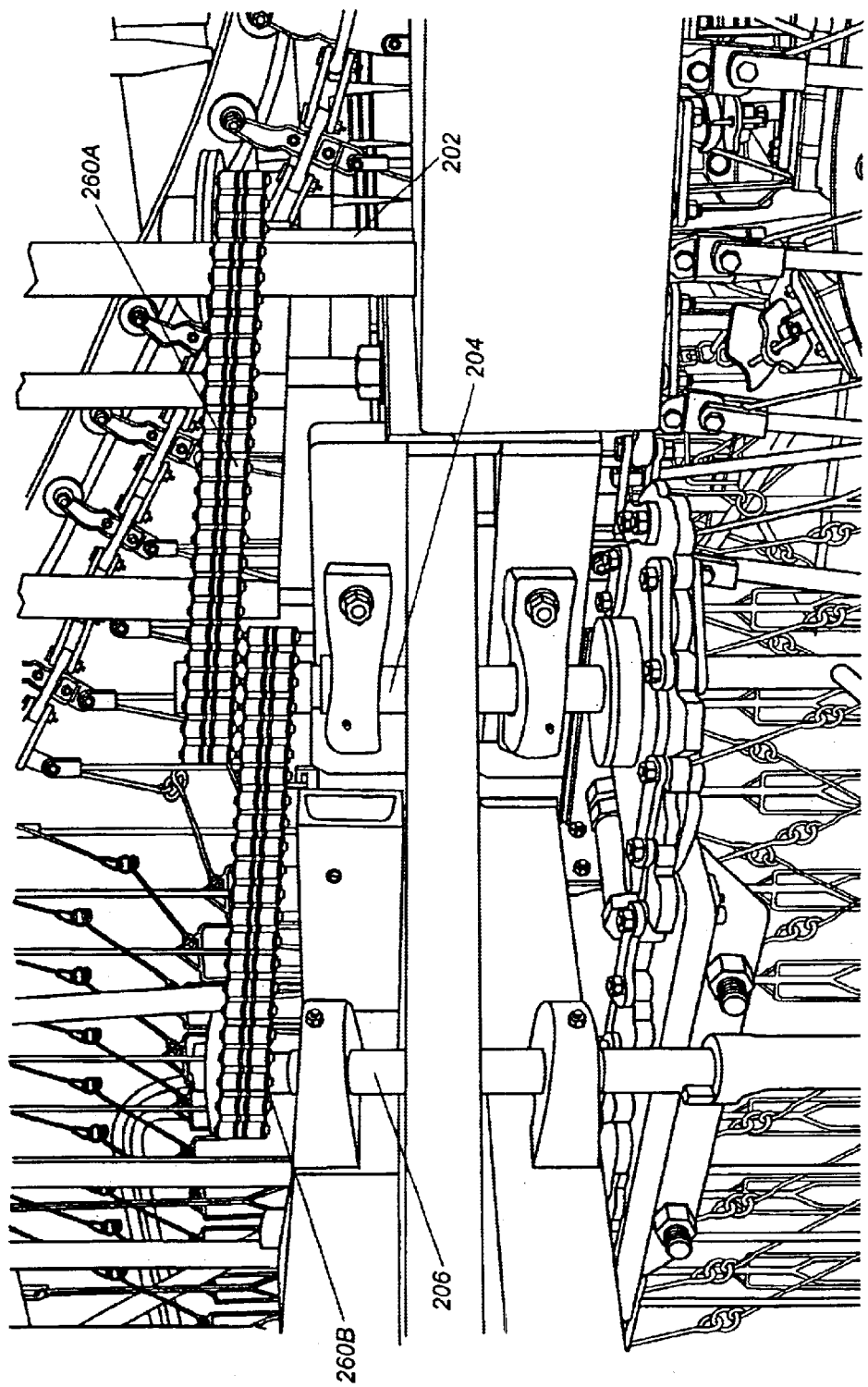
FIG. 26 is a pictorial view of the drive chains that are used to drive both the compression module and the conveyor to which the suspension devices are attached, according to a preferred embodiment of the invention.

One important aspect of the second preferred embodiment is that the suspension device 34, the clasping device 40, and the compression assembly 100 are preferably driven at the same speed. Thus, as shown in FIG. 26, in one preferred embodiment of the invention, the drive shafts 202, 204, 206 of the suspension device 34, the clasping device 40, and the compression assembly 100 are linked together by drive chains 260a and 260b. This configuration is advantageous because it allows all three devices to be driven using a single driving means.

Alternative Embodiments of the Invention

Many modifications and other embodiments of the invention will come to mind to one skilled in the art to which this invention pertains having the benefit of the teachings presented in the foregoing descriptions and the associated drawings. For example, the above apparatus could be configured so that a compressive force is applied to the bird 30 by moving the bird 30 relative to the compression member 101, rather than moving the compression member 101 relative to the bird 30. Similarly, rather than squeezing the opposite side portions of the bird and then applying a compressive force to a top surface of the bird 30, the above apparatus could be configured to apply pressure to the two opposing top surfaces of the bird and then force feces from the bird 30 by applying a compressive force to one or both sides of the bird 30.

By the same token, the track-guided compression assembly 100 described above could be replaced by any of a variety of different types of compression devices known in the art. For example, this compression assembly 100 could be replaced by a pneumatic or hydraulic compression assembly. The structure of this compression assembly 100 could also be modified in any of a variety of ways known in the art.

Additionally, the right and left side plates may be non-planar and may be of any practical shape or size. These side plates may also be part of a common structure. For example, the right and left side plates might be the right and left legs of a v-shaped clamp.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A poultry feces removal apparatus comprising:
   a clasping device that is adapted to receive a bird and to provide lateral support to for said bird, said clasping device being adapted to rotate between a first position, in which said bird is in a substantially vertical position, and a second position, in which said bird is in a substantially horizontal position; and
   a compression assembly that is adapted to force feces out of said bird by exerting a compressive force on an exterior surface of said bird while said clasping device is providing lateral support to said bird and while said clasping device is in said second position.

2. The poultry feces removal apparatus of claim 1, wherein said exterior surface is a top surface of a central body portion of said bird.

3. The poultry feces removal apparatus of claim 1, wherein said clasping device comprises a first side member and a second side member, said second side member being spaced apart from said first side member to define a space for receiving said bird, and said first and second side members being configured to exert pressure on opposite sides of said bird.

4. The poultry feces removal apparatus of claim 1, wherein said compression assembly is a first compression assembly, and further comprising:
   a conveyor for moving said bird along a predetermined path; and
   a second compression assembly;
   said first and second compression assemblies being included within a compression module that is positioned along said predetermined path; and
   said clasping device being configured for lateral movement, along said predetermined path, relative to said compression module.

5. The poultry feces removal apparatus of claim 4, wherein said clasping device and at least one of said first and second compression assemblies are configured to move at substantially the same speed.

6. The poultry feces removal apparatus of claim 4, wherein at least one of said first and second compression assemblies is configured to move in tandem with said clasping device while said at least one of said first and second compression assemblies exerts said compressive force on said exterior surface of said bird.

7. The poultry feces removal apparatus of claim 6, wherein at least one of said first and second compression assemblies comprises a compression member, and wherein said compression member is configured to be moved along an axis that is substantially perpendicular to a top surface of said bird.

8. The poultry feces removal apparatus of claim 6, wherein at least one of said compression assemblies comprises a compression member, and wherein said compression member has an upper surface and a lower surface, and further comprising:
   an alignment device that allows said compression member to shift orientation to a limited extent so that said lower surface of said compression member generally aligns with said exterior surface of said bird as said compression member exerts said compressive force on said exterior surface of said bird.

9. The poultry feces removal apparatus of claim 8, wherein said alignment device comprises:
   a support plate defining an alignment opening;
   an alignment pin adjacent to, and extending away from, said upper surface of said compression member, and said alignment pin extending through said alignment opening; and
   a flexible stabilizing member that is disposed between a portion of said alignment pin and an interior portion of said alignment opening so that as said compression member is moved relative to said exterior surface of said bird, said compression member is maintained in general alignment with said exterior surface of said bird, and is free to shift slightly to register with said exterior surface of said bird as said compression member exerts said compressive force on said exterior surface of said bird.

10. The poultry feces removal apparatus of claim 4, wherein at least one of said compression assemblies comprises a compression member, said compression member having an upper surface and a lower surface, and said poultry feces removal apparatus further comprising an alignment device that allows said compression member to shift orientation to a limited extent so that the lower surface of said compression member generally aligns with said exterior surface of said bird as the compression member exerts said compressive force on said exterior surface of said bird.

11. The poultry feces removal apparatus of claim 10, wherein said alignment device comprises:
   a support plate defining an alignment opening;
   an alignment pin adjacent to, and extending away from, said upper surface of said compression member, and said alignment pin extending through said alignment opening; and
   a flexible stabilizing member that is disposed between a portion of said alignment pin and an interior portion of said alignment opening so that as said compression member is moved relative to said exterior surface of said bird, said compression member is maintained in general alignment with said exterior surface of said bird, and is free to shift slightly to register with said exterior surface of said bird as said compression member exerts said compressive force on said exterior surface of said bird.

12. The poultry feces removal apparatus of claim 1, wherein said clasping device is configured for movement relative to said compression assembly.

13. The poultry feces removal apparatus of claim 12, wherein said compression assembly comprises a rotable wheel.

14. The poultry feces removal apparatus of claim 1, wherein said compression assembly comprises a compression member for exerting a force on said exterior surface of said bird, and wherein said compression member is configured to substantially conform to said exterior surface of said bird.

15. The poultry feces removal apparatus of claim 1, wherein said compression assembly comprises a compression member for exerting a force on said exterior surface of said bird, and wherein a portion of said compression member is substantially in a shape of a portion of an exterior surface of a bird's chest.

16. The poultry feces removal apparatus of claim 1, wherein said compression assembly is configured to move in tandem with said clasping device while said compression assembly exerts said compressive force on said exterior surface of said bird.

17. The poultry feces removal apparatus of claim 1, wherein said compression assembly comprises a compression member for exerting a force on said exterior surface of said bird, and wherein said compression member is configured to be moved along an axis that is substantially perpendicular to a top surface of said bird.

18. A poultry feces removal apparatus comprising:
   a clasping device comprising:
      a back support portion; and
      two opposing side members adjacent said back support portion, said clasping device being adapted to: (A) receive a bird between said two opposing side members; (B) squeeze said bird about said bird's midsection by moving said two opposing side members toward each other; and (C) rotate between a first position, in which said bird is in a substantially vertical position, and a second position, in which said bird is in a substantially horizontal position; and
   a compression member that is spaced apart from said clasping device and that is adapted to force feces from said bird by exerting a compressive force on an exterior surface of said bird while said clasping device is squeezing said bird about said bird's midsection, and while said clasping device is in said second position.

19. The poultry feces removal apparatus of claim 18, wherein said compression member is a first compression member, said poultry feces removal apparatus further comprising:
   a conveyor for moving said bird along a predetermined path; and
   a second compression member;
   said first and second compression members being included within a compression module that is positioned along said predetermined path; and
   said clasping device being configured for lateral movement, along said predetermined path, relative to said compression module.

20. The poultry feces removal apparatus of claim 19, wherein said clasping device and at least one of said compression members are configured to move at substantially the same speed.

21. A method of removing feces from a bird, said method comprising the steps of:
   (a) using an automated device to squeeze said bird, said step of using said automated device to squeeze said bird comprising the step of applying a first amount of pressure to opposing first and second sides of said bird;
   (b) while squeezing said bird, exerting a first discrete compressive force on an exterior surface located on a third side of said bird, said first discrete compressive force being sufficient to force feces out of said bird;
   (c) applying a second amount of pressure to said opposing first and second sides of said bird, said second amount of pressure being greater than said first amount of pressure; and
   (d) while applying said second amount of pressure, exerting a second discrete compressive force on said third side of said bird, said second discrete compressive force being sufficient to force feces out of the body of said bird.

22. The method of claim 21, further comprising the steps of:
   (e) applying a third amount of pressure to said opposing first and second sides of said bird, said third amount of pressure being greater than said first amount of pressure and said second amount of pressure; and
   (f) while applying said third amount of pressure, exerting a third discrete compressive force on said third side of said bird, said third discrete compressive force being sufficient to force feces out of the body of said bird.

23. The method of claim 22, wherein said steps (a) and (b) of applying said first amount of pressure and exerting a first discrete compressive force are executed before said steps (c) and (d) of applying said second amount of pressure and exerting a second discrete compressive force.

24. The method of claim 23, wherein said steps (e) and (f) of applying said third amount of pressure and exerting a third discrete compressive force are executed after said steps (c) and (d) of applying said second amount of pressure and exerting a second discrete compressive force.

* * * * *